US012553526B2

United States Patent
Min et al.

(10) Patent No.: US 12,553,526 B2
(45) Date of Patent: Feb. 17, 2026

(54) VALVE DEVICE

(71) Applicant: SAMSUNG ELECTRONICS CO., LTD., Suwon-si (KR)

(72) Inventors: Seulki Min, Suwon-si (KR); Kookjeong Seo, Suwon-si (KR); Heemoon Jeong, Suwon-si (KR); Insub Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 402 days.

(21) Appl. No.: 17/876,154

(22) Filed: Jul. 28, 2022

(65) Prior Publication Data

US 2023/0097656 A1  Mar. 30, 2023

Related U.S. Application Data

(63) Continuation of application No. PCT/KR2022/008765, filed on Jun. 21, 2022.

(30) Foreign Application Priority Data

Sep. 30, 2021  (KR) .................. 10-2021-0129715

(51) Int. Cl.
*F16K 11/074* (2006.01)
*F16K 31/53* (2006.01)
(Continued)

(52) U.S. Cl.
CPC .......... *F16K 11/074* (2013.01); *F16K 31/535* (2013.01); *F25B 41/20* (2021.01); *F25B 41/37* (2021.01)

(58) Field of Classification Search
CPC ........ F16K 11/074; F16K 31/535; F16K 3/04; F16K 39/045; F16K 3/08; F16K 11/0743;
(Continued)

(56) References Cited

U.S. PATENT DOCUMENTS

| | | |
|---|---|---|
| 11,143,330 B2 | 10/2021 | Yokoe |
| 2006/0060807 A1 | 3/2006 | Hara et al. |

(Continued)

FOREIGN PATENT DOCUMENTS

| | | |
|---|---|---|
| EP | 1 176 346 A2 | 1/2002 |
| EP | 1 176 346 A3 | 11/2002 |

(Continued)

OTHER PUBLICATIONS

Office Action issued by the European Patent Office on Apr. 23, 2025 for Application No. 22 876 618.4.

(Continued)

*Primary Examiner* — Tavia Sullens
(74) *Attorney, Agent, or Firm* — STAAS & HALSEY LLP

(57) ABSTRACT

A valve device includes a case including an open lower portion and an accommodation space provided therein, a base plate to cover the open lower portion of the case, a refrigerant inlet pipe connected to the base plate and to allow a refrigerant to flow into the accommodation space, an inlet and outlet pipe connected to the base plate to allow the refrigerant to flow in and out, a boss including a refrigerant inlet and outlet hole formed at a first position spaced apart from a center to communicate with the inlet and outlet pipe, and an extending groove extending radially outward from the first position to a second position and connected to the refrigerant inlet and outlet hole, and a pad including an open cavity rotatable on one side of the boss to close the refrigerant inlet and outlet hole and to open the extending groove.

8 Claims, 21 Drawing Sheets

(51) Int. Cl.
*F25B 41/20* (2021.01)
*F25B 41/37* (2021.01)

(58) Field of Classification Search
CPC .......... F16K 11/0787; F16K 3/32; F16K 3/34; F25B 41/20; F25B 41/37; F25B 47/022; F25B 47/02
See application file for complete search history.

(56) References Cited

U.S. PATENT DOCUMENTS

| | | | |
|---|---|---|---|
| 2012/0080623 | A1 | 4/2012 | Kang |
| 2018/0363787 | A1* | 12/2018 | Kubota ................... F16K 3/085 |

FOREIGN PATENT DOCUMENTS

| | | | | |
|---|---|---|---|---|
| EP | 1 266 162 | B1 | 9/2005 | |
| JP | 5-302777 | | 11/1993 | |
| JP | 2001-153494 | | 6/2001 | |
| JP | 2003-65449 | | 3/2003 | |
| JP | 6129627 | B2 | 5/2017 | |
| JP | 2018-189175 | | 11/2018 | |
| KR | 10-0581419 | B1 | 5/2006 | |
| KR | 10-1167956 | | 7/2012 | |
| KR | 10-1394328 | B1 | 5/2014 | |
| KR | 10-1622727 | | 5/2016 | |
| KR | 20160124652 | A * | 10/2016 | .......... F16K 11/0704 |
| KR | 10-1753487 | | 7/2017 | |
| KR | 10-1849959 | B1 | 4/2018 | |
| KR | 10-1853696 | | 5/2018 | |
| KR | 10-2022-0073490 | A | 6/2022 | |
| WO | WO 2006/054879 | | 5/2006 | |

OTHER PUBLICATIONS

Office Action issued by the European Patent Office on Aug. 6, 2024 for European Patent Application No. 22876618.4.

* cited by examiner

VALVE DEVICE

CROSS-REFERENCE TO RELATED APPLICATION(S)

This application is a continuation application, under 35 U.S.C. § 111(a), of international application No. PCT/KR2022/008765, filed on Jun. 21, 2022, which claims priority to Korean Patent Application No. 10-2021-0129715, filed on Sep. 30, 2021 in the Korean Intellectual Property Office, the disclosure of which is incorporated by reference herein in its entirety

BACKGROUND

1. Field

The disclosure relates to a valve device including an improved structure.

2. Description of Related Art

In general, in a cooling device to which a refrigeration cycle is applied, a refrigerant circulates through a compressor, a condenser, an expansion device, and an evaporator to generate cold air.

The refrigerant compressed in the compressor is transferred to the condenser through a refrigerant pipe and then condensed, and the refrigerant condensed in the condenser is transferred to the expansion device and expanded. The refrigerant expanded in the expansion device is transferred to the evaporator, and the refrigerant generates cold air through heat exchange in the evaporator.

In the case of a refrigerator, the refrigerant condensed in the condenser is transferred to the expansion device through a refrigerant pipe. The refrigerant condensed in the condenser is directly transferred to the expansion device or transferred to the expansion device through a hot pipe by passing through a branch tube branched from the refrigerant pipe.

The hot pipe is a pipe installed to prevent dew from forming on a gasket of a refrigerator door, which is a temperature-vulnerable part of the refrigerator. That is, a high-temperature refrigerant in a high-pressure part of the refrigeration cycle passes through the hot pipe to prevent the formation of dew on the gasket of the refrigerator door. The hot pipe only needs to maintain a temperature above the dew point according to a humidity of the outside air, but when the temperature is maintained above the dew point in the refrigerator, it acts as a heat load inside the refrigerator, thereby increasing the power consumption of the refrigerator.

Therefore, according to operating conditions, the refrigerant condensed in the condenser is transferred to the expansion device through the hot pipe or directly transferred to the expansion device without passing through the hot pipe. When there is no need to transfer the refrigerant to the hot pipe, it is possible to increase energy efficiency by preventing the refrigerant from being transferred to a branch pipe connected to the hot pipe.

In addition, a plurality of capillary tubes serving as the expansion device may be provided with different inner diameters and different lengths in order to respond to a cooling load that varies according to an external temperature, a set temperature, an input load, and the like. In this case, the refrigerant flows into an appropriate capillary tube among the plurality of capillary tubes according to the cooling load.

Under a high load condition in which the external temperature or the internal temperature of the refrigerator is high, it is required to increase a refrigerant flow rate to the maximum level in order to rapidly cool an internal space and thus there is a need to perform a mode in which a refrigerant passes through all of the plurality of capillary tubes. At the same time, there is a need for a valve device configured to selectively pass or bypass the hot pipe.

SUMMARY

Therefore, it is an aspect of the disclosure to provide a valve device including an improved structure configured to perform a mode, in which a refrigerant passes or bypasses a hot pipe, and at the same time, configured to perform a mode in which a refrigerant passes a first capillary tube and a second capillary tube.

Additional aspects of the disclosure will be set forth in part in the description which follows and, in part, will be obvious from the description, or may be learned by practice of the disclosure.

In accordance with an aspect of the disclosure, a valve device includes a case including an open lower portion and an accommodation space, a base plate to cover the open lower portion of the case, a refrigerant inlet pipe connected to the base plate and to allow a refrigerant to flow into the accommodation space, an inlet and outlet pipe connected to the base plate to allow the refrigerant to flow in and out, a boss including a refrigerant inlet and outlet hole formed at a first position spaced apart from a center to communicate with the inlet and outlet pipe, and an extending groove extending radially outward from the first position to a second position and connected to the refrigerant inlet and outlet hole, and a pad including an open cavity to be rotatable on one side of the boss to close the refrigerant inlet and outlet hole and to open the extending groove.

The first position may be at a position away from the center of the boss by a first distance in a radial direction, and the second position may be at a position away from the center of the boss by a second distance in the radial direction. The second distance may be greater than the first direction.

The extending groove may include an opening member in communication with the accommodation space by the open cavity of the pad, to receive the refrigerant, and a connection member connected to the opening member to allow the refrigerant to flow into the refrigerant inlet and outlet hole.

The open cavity of the pad may be cut from an outside of the pad to an inside of the pad to communicate with the accommodation space.

The open cavity may correspond to a first open cavity, and the pad may further include a sealing body in contact with an upper surface of the boss to close the refrigerant inlet and outlet hole and the extending groove of the boss, and a second open cavity cut from the outside of the pad to the inside of the pad so as to open the refrigerant inlet and outlet hole at one side of the sealing body.

The sealing body may include a connection cavity cut along the rotational direction of the pad at the first position.

The refrigerant inlet and outlet hole may be a first refrigerant inlet and outlet hole, and the boss may further include a second refrigerant inlet and outlet hole, a third refrigerant inlet and outlet hole, and a fourth refrigerant inlet and outlet hole, which are spaced apart from each other at intervals of 90 degrees clockwise from the first refrigerant inlet and outlet hole with respect to the center of the boss.

The valve device may further include a first inlet and outlet pipe connected to the first refrigerant inlet and outlet hole, a second inlet and outlet pipe connected to the second refrigerant inlet and outlet hole, a third inlet and outlet pipe connected to the third refrigerant inlet and outlet hole, and a fourth inlet and outlet pipe connected to the fourth refrigerant inlet and outlet hole.

The refrigerant inlet pipe may be connected to receive the refrigerant from the condenser therethrough, the first inlet and outlet pipe and the third inlet and outlet pipe may be connected to a hot pipe, the fourth inlet and outlet pipe may be connected to a first capillary tube, and the second inlet and outlet pipe may be connected to a second capillary tube.

In response to operating in a simultaneous open mode of the valve device, the pad is rotated to allow the first open cavity to open the extending groove and to allow the second open cavity to open the fourth refrigerant inlet and outlet hole so that the refrigerant introduced into the accommodation space through the refrigerant inlet pipe is introduced into the fourth refrigerant inlet and outlet hole and then flow to the first capillary tube, and at the same time, the refrigerant introduced into the first refrigerant inlet and outlet hole through the extending groove is introduced into the third refrigerant inlet and outlet hole through the hot pipe, and then introduced into the second refrigerant inlet and outlet hole through the connection cavity and flows into the second capillary tube.

The first open cavity and the second open cavity may be to be connected to each other.

The refrigerant inlet and outlet hole may be a second refrigerant inlet and outlet hole, and the boss may further include a plurality of refrigerant inlet and outlet holes including the second refrigerant inlet and outlet hole, a third refrigerant inlet and outlet hole, a fourth refrigerant inlet and outlet hole, and a first refrigerant inlet and outlet hole, which are spaced apart from each other at intervals of 90 degrees clockwise from the second refrigerant inlet and outlet hole with respect to the center of the boss.

The open cavity may correspond to a first open cavity, and the pad may further include a sealing body in contact with an upper surface of the boss to close the plurality of refrigerant inlet and outlet holes and the extending groove of the boss, and a second open cavity cut from the outside of the sealing body to the inside of the sealing body so as to sequentially open the plurality of the refrigerant inlet and outlet holes according to the rotation of the pad.

The first open cavity and the second open cavity may be to be spaced apart from to each other.

In response to operating in a simultaneous open mode of the valve device, the first open cavity opens the extending groove, the second open cavity opens the fourth refrigerant inlet and outlet hole and the refrigerant flows into the second refrigerant inlet and outlet hole, passes through the second capillary tube, flows through the fourth refrigerant inlet and outlet hole and passes through the first capillary tube.

In accordance with another aspect of the disclosure, a valve device includes a case including an open lower portion and an accommodation space therein, a base plate to cover the open lower portion of the case, a refrigerant inlet pipe connected to the base plate and to allow a refrigerant to flow into the accommodation space, a plurality of inlet and outlet pipes connected to the base plate to allow the refrigerant to flow in and out, a first boss including a plurality of refrigerant inlet and outlet holes connected to the plurality of inlet and outlet pipes, a first pad including a first open cavity to be rotatable on one side of the first boss so as to sequentially open the plurality of refrigerant inlet and outlet holes, a second boss including a refrigerant flow hole connected to a connection pipe communicating with one of the plurality of inlet and outlet pipes, and a second pad including a second open cavity to be rotatable on one side of the second boss so as to open the refrigerant flow hole.

The valve device may include a pinion gear, a first pad gear coupled to the first pad so as to rotate the first pad by interlocking with the rotation of the pinion gear, and a second pad gear coupled to the second pad to rotate the second pad by interlocking with the rotation of the pinion gear.

In response to operating in a simultaneous open mode of the valve device, the first open cavity of the first pad opens the refrigerant inlet and outlet hole connected to a first capillary tube of the first boss so that the refrigerant flows into the inlet and outlet pipe connected to the first capillary tube, and at the same time, the second open cavity of the second pad opens the refrigerant flow hole of the second boss so that the refrigerant flows into the inlet and outlet pipe connected to a second capillary tube through the connection pipe.

In response to opening the refrigerant inlet and outlet hole connected to the first capillary tube of the first boss by the first open cavity of the first pad, the refrigerant may flow into the inlet and outlet pipe connected to the first capillary tube, and at the same time, in response to opening the refrigerant flow hole of the second boss by the second open cavity of the second pad, the refrigerant may flow into the inlet and outlet pipe connected to a hot pipe through the connection pipe.

The first pad may further include a connection cavity recessed to form a space in which the refrigerant flows, and in response to operating in the simultaneous open mode, the refrigerant flowing through the inlet and outlet pipe connected to the hot pipe flows into the inlet and outlet pipe connected to the second capillary tube through the connection cavity.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
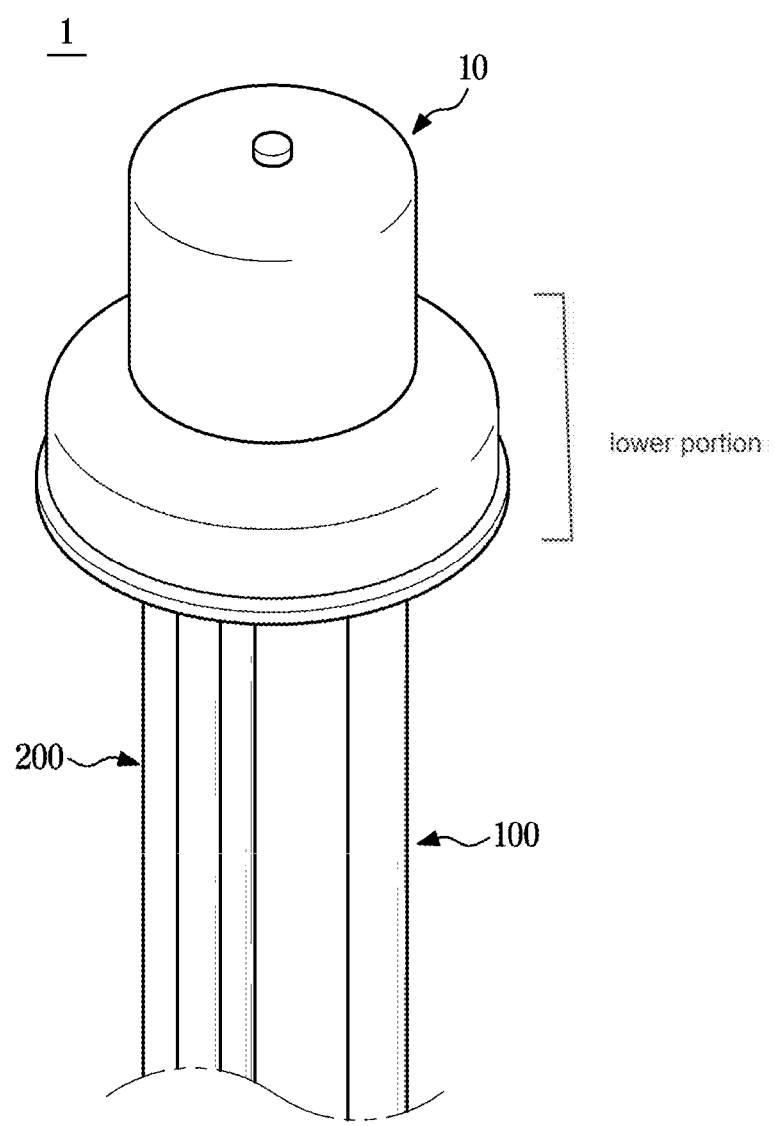
FIG. 1 is a perspective view illustrating a valve device according to an embodiment of the disclosure.

Embodiments described in the disclosure and configurations illustrated in the drawings are merely examples of the embodiments of the disclosure, and may be modified in various different ways at the time of filing of the present application to replace the embodiments and drawings of the disclosure.

In addition, the same reference numerals or signs illustrated in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

The disclosure will be described more fully hereinafter with reference to the accompanying drawings.

Figure 2:
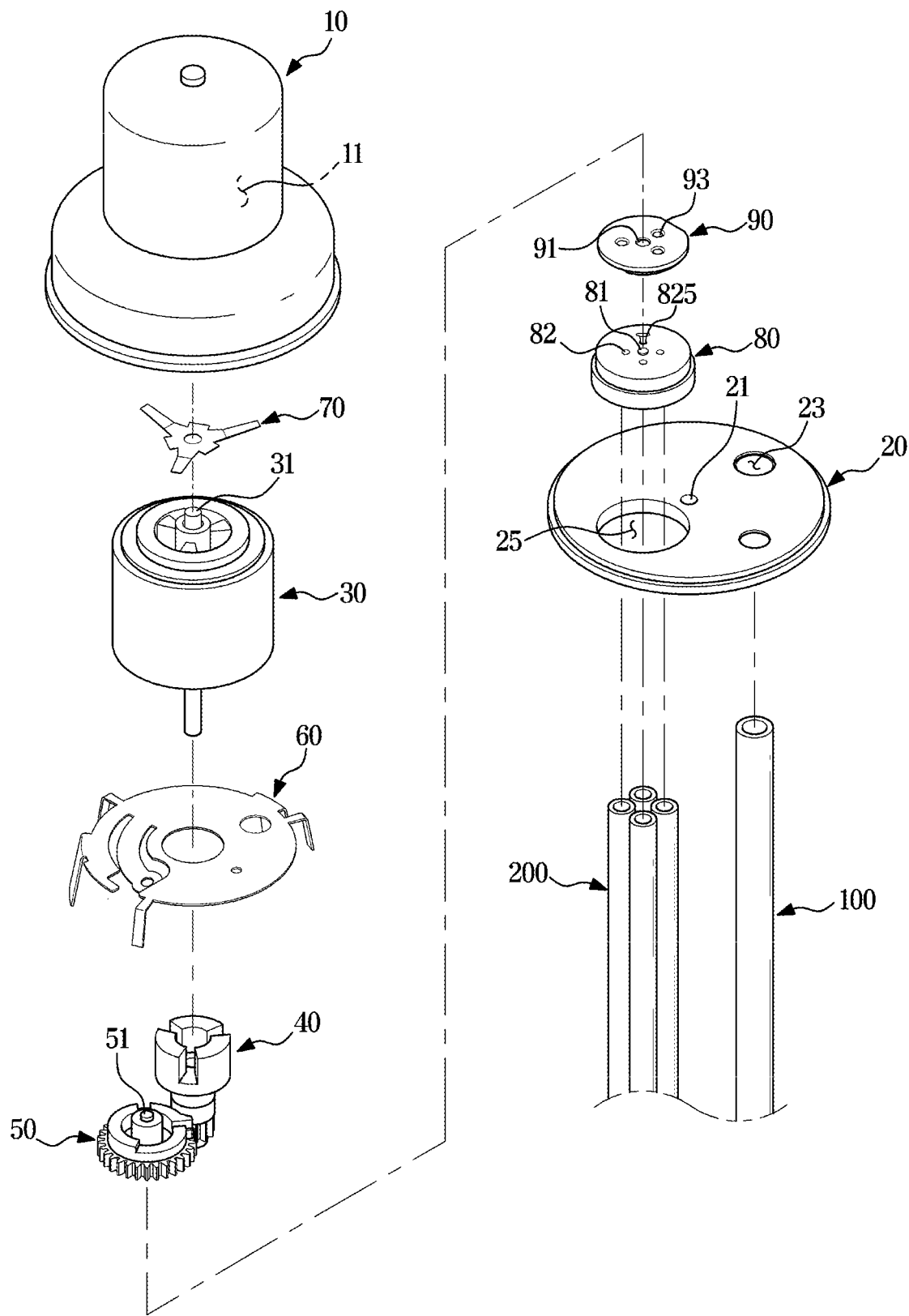
FIG. 2 is an exploded perspective view of the valve device according to an embodiment of the disclosure.
Figure 3:
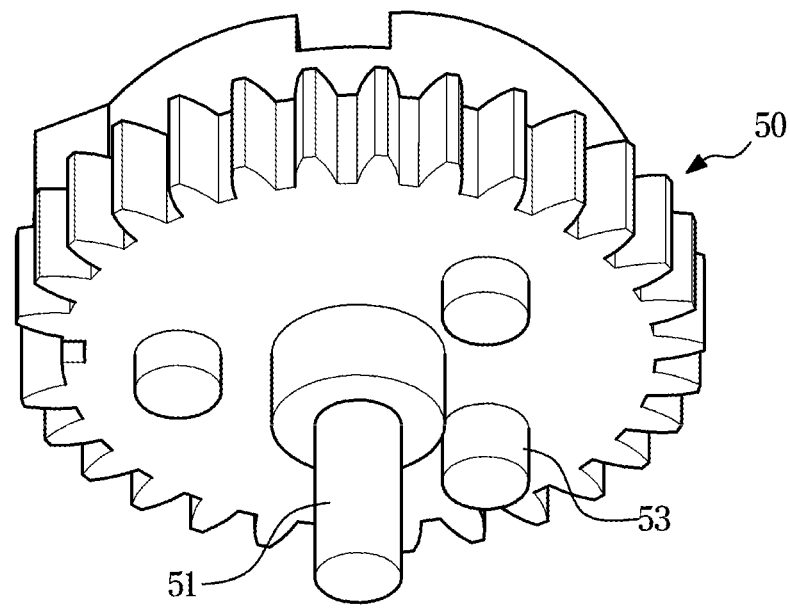
FIG. 3 is a bottom view illustrating a state, in which a pad gear and a pad of the valve device according to an embodiment of the disclosure are coupled.
Figure 3:
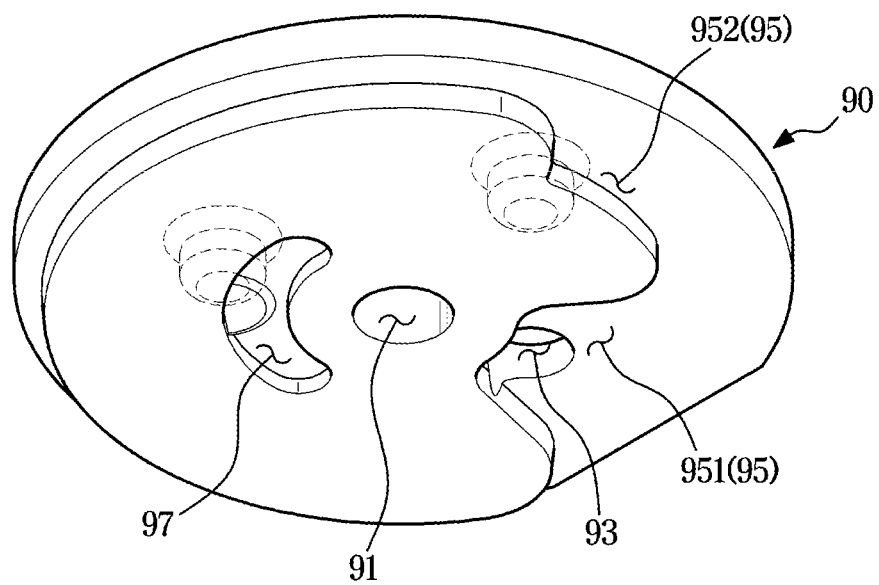
Figure 4:
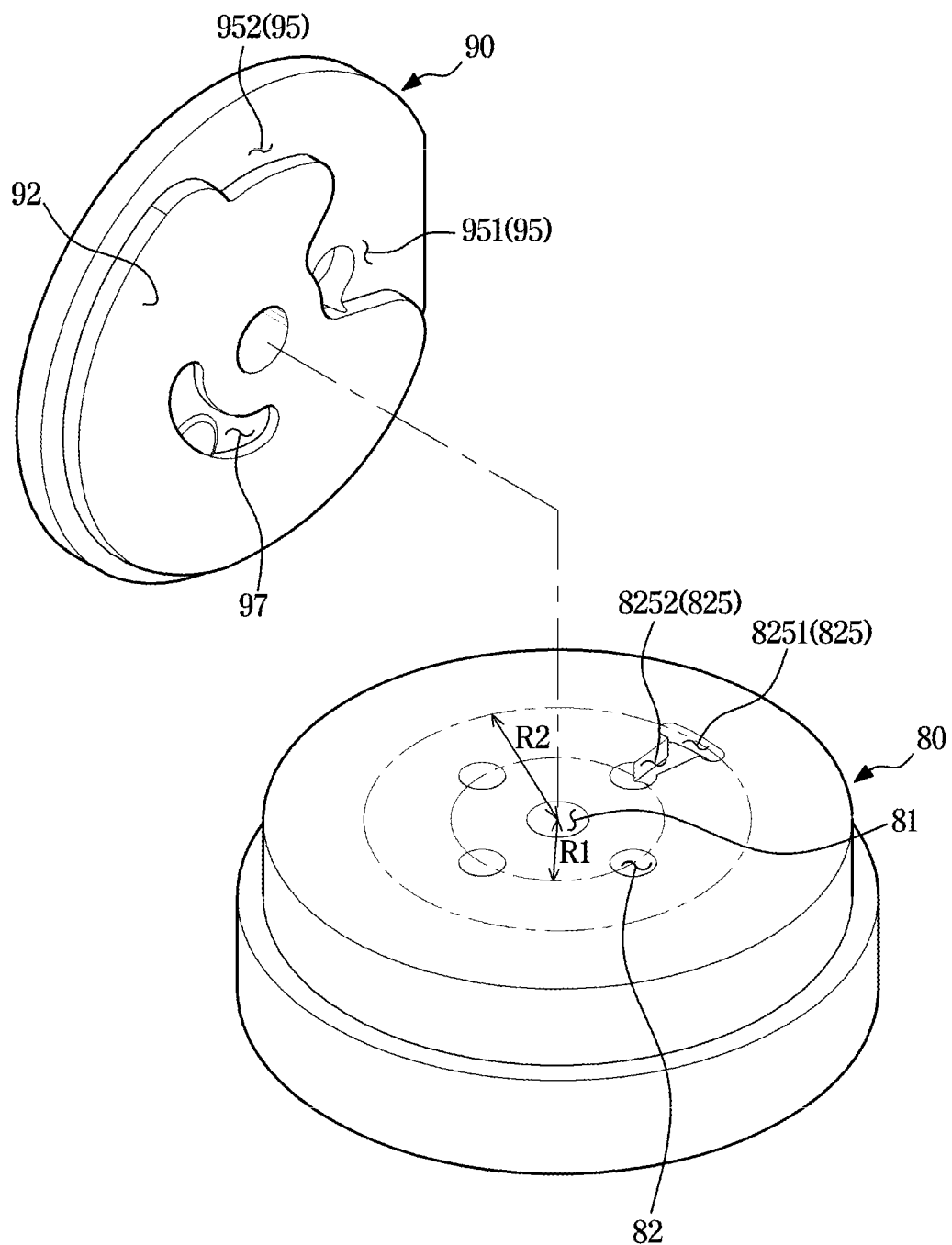
FIG. 4 is a view illustrating the pad and a boss according to an embodiment of the valve device according to an embodiment of the disclosure.
Figure 5:
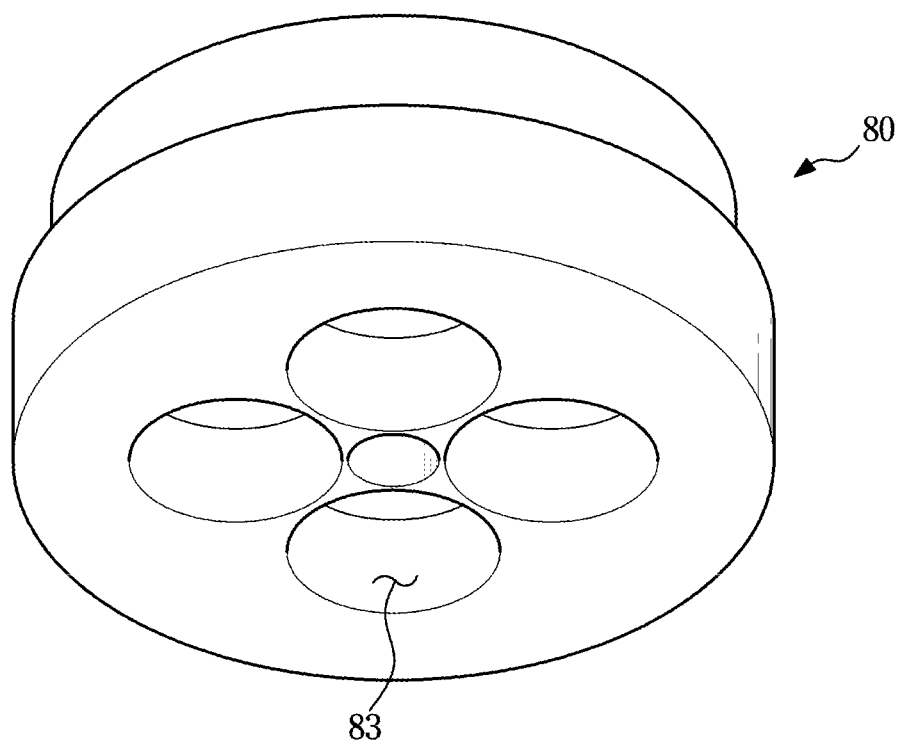
FIG. 5 is a bottom view illustrating the boss of the valve device according to an embodiment of the disclosure.
Figure 6:
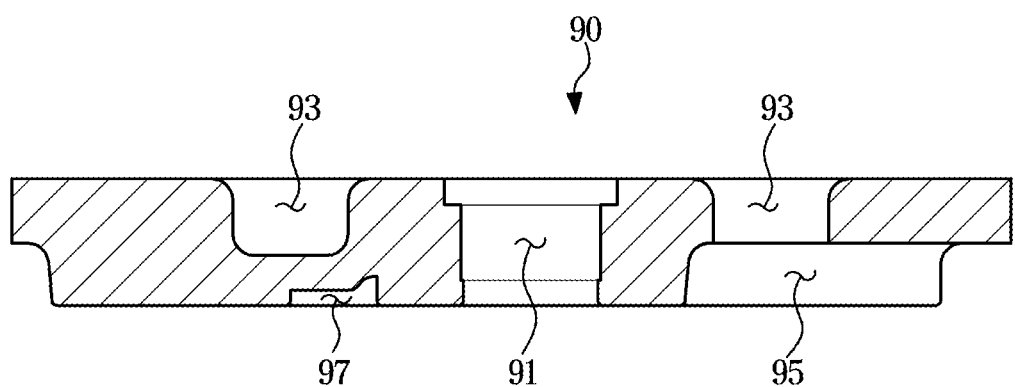
FIG. 6 is a cross-sectional view illustrating the pad of the valve device according to an embodiment of the disclosure.
Figure 7:
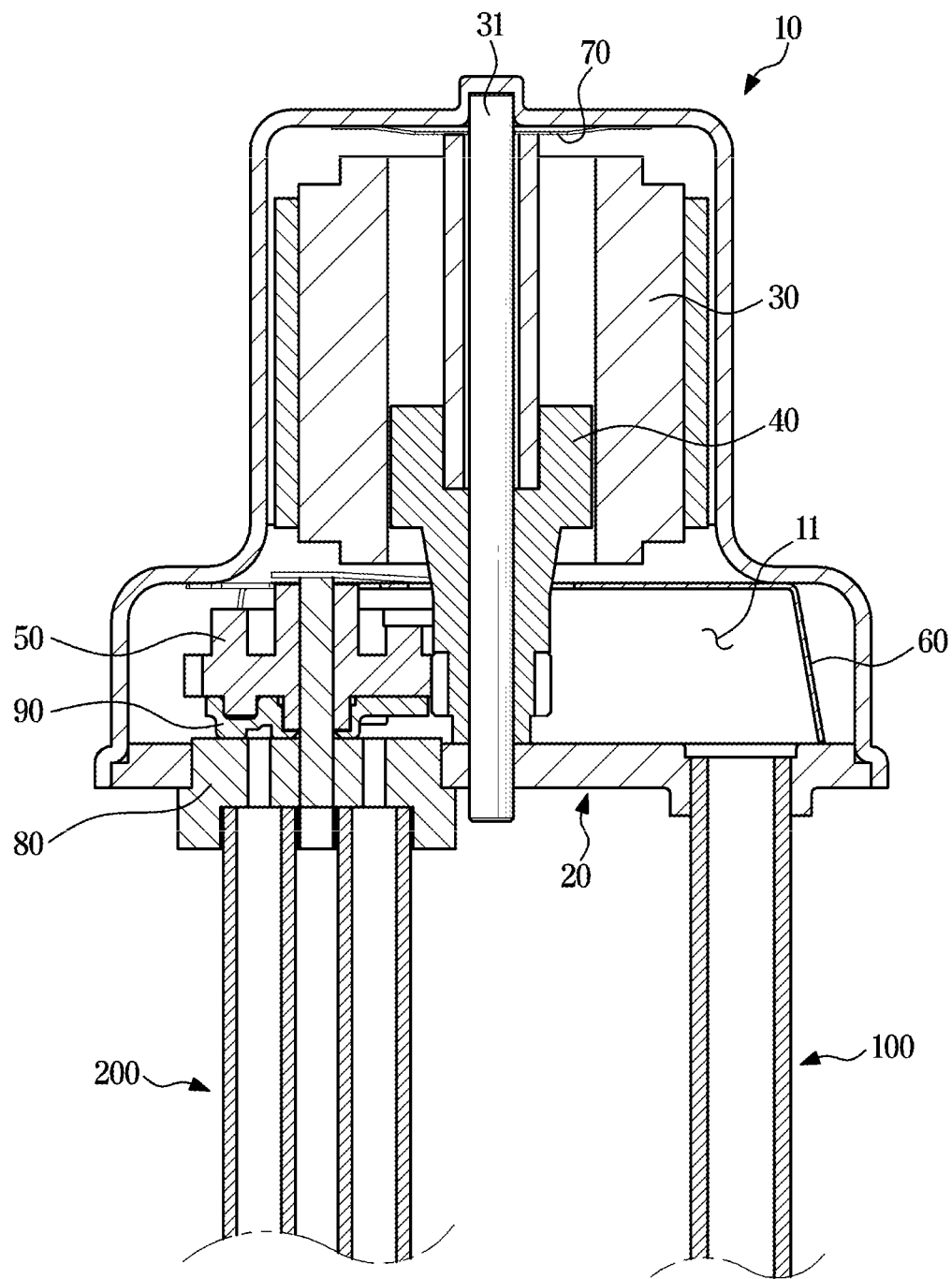
FIG. 7 is a side cross-sectional view illustrating the valve device according to an embodiment of the disclosure.

FIG. 1 is a perspective view illustrating a valve device according to an embodiment of the disclosure. FIG. 2 is an exploded perspective view of the valve device according to an embodiment of the disclosure. FIG. 3 is a bottom view illustrating a state, in which a pad gear and a pad of the valve device according to an embodiment of the disclosure are coupled. FIG. 4 is a view illustrating the pad and a boss according to an embodiment of the valve device according to an embodiment of the disclosure. FIG. 5 is a bottom view illustrating the boss of the valve device according to an embodiment of the disclosure. FIG. 6 is a cross-sectional view illustrating the pad of the valve device according to an embodiment of the disclosure. FIG. 7 is a side cross-sectional view illustrating the valve device according to an embodiment of the disclosure.

As illustrated in FIGS. 1 to 7, a valve device 1 may include a case 10, a base plate 20 covering an open lower portion of the case 10, and a refrigerant inlet pipe 100 through which a refrigerant is introduced, a plurality of inlet and outlet pipes 200 through which a refrigerant flows in and out, a boss 80 including a plurality of refrigerant inlet and outlet holes 82 through which the refrigerant flows in and out, and a pad 90 rotatably arranged on the upper side of the boss 80.

The case 10 may be provided such that the lower portion is opened and an accommodation space 11 is formed therein.

A rotor 30 may be provided in the accommodation space 11 inside the case 10. The rotor 30 may include a rotor shaft 31.

Further, a pinion gear 40 may be provided in the accommodation space 11. The pinion gear 40 may be connected to the rotor 30. The pinion gear 40 may be connected to the rotor shaft 31 so as to rotate together with the rotor 30.

In addition, a pad gear 50 may be provided in the accommodation space 11. The pad gear 50 may be arranged on a lateral side of the pinion gear 40. The pad gear 50 may be gear-coupled to the pinion gear 40 and interlock with the pinion gear 40.

Accordingly, in response to the rotation of the pinion gear 40 by the rotor 30, the pad gear 50 may be rotated by the pinion gear 40.

The pad gear 50 may include a pad valve shaft 51 that is a rotation shaft. The pad valve shaft 51 may be connected to the pad 90 to allow the pad 90 to rotate together with the pad gear 50.

The pad gear 50 may include a pad coupling protrusion 53 coupled to the pad 90. The pad coupling protrusions 53 may be provided in plurality. The pad coupling protrusion 53 may be provided on a lower surface of the pad gear 50. The pad coupling protrusion 53 may be coupled to a pad gear coupling hole 93 formed on an upper surface of the pad 90.

In addition, an elastic support spring 60 may be provided in the accommodation space 11. The elastic support spring 60 may be fixed to the case 10 in the accommodation space 11. The elastic support spring 60 may be formed in a plate shape. The elastic support spring 60 may elastically support an upper central portion of the pad gear 50. The pad gear 50 may be rotatably mounted to the elastic support spring 60.

Further, a rotor support plate spring 70 may be provided in the accommodation space 11. The rotor support plate spring 70 may be fixed to the case 10 in the accommodation space 11. The rotor support plate spring 70 may elastically support the rotor 30. The rotor 30 may be rotatably supported by the rotor support plate spring 70.

The base plate 20 may cover the open lower portion of the case 10. The base plate 20 may include a rotor shaft support hole 21 through which the rotor shaft 31 is rotatably supported. The base plate 20 may include a refrigerant inlet hole 23 connected to the refrigerant inlet pipe 100 through which the refrigerant flows. The base plate 20 may include a boss hole 25 in which the boss 80 is installed.

The boss 80 may be installed in the boss hole 25 of the base plate 20. An upper portion of the boss 80 may be arranged in the accommodation space 11. A lower portion of the boss 80 may be arranged outside the accommodation space 11.

The boss 80 may include a pad valve shaft hole 81 into which the pad valve shaft 51 is rotatably inserted.

The boss 80 may include the plurality of refrigerant inlet and outlet holes 82 through which the refrigerant flows in and out. Four refrigerant inlet and outlet holes 82 may be provided. Accordingly, four inlet and outlet pipes 200 connected to the plurality of refrigerant inlet and outlet holes 82 may be provided.

The boss 80 may include a plurality of insertion holes 83 into which the plurality of inlet and outlet pipes 200 is inserted. The plurality of insertion holes 83 may be connected to the plurality of refrigerant inlet and outlet holes 82.

The pad 90 may be rotatably arranged on the boss 80. The pad 90 may include a pad valve shaft coupling hole 91 to which the pad valve shaft 51 is coupled. The pad 90 may include a pad gear coupling hole 93 to which the pad coupling protrusion 53 of the pad gear 50 is coupled. Accordingly, the pad 90 may rotate together with the pad gear 50.

The pad 90 may include a first open cavity 951 provided to selectively open one of the refrigerant inlet and outlet holes 82 formed in the boss 80. The pad 90 may include a second open cavity 952.

That is, the pad 90 may rotate together with the pad gear 50 to selectively open one of the refrigerant inlet and outlet holes 82 formed in the boss 80.

The first open cavity 951 and the second open cavity 952 may be formed in the lower portion of the pad 90. The first open cavity 951 and the second open cavity 952 may be provided on the lower surface of the pad 90 and formed in the form of a groove recessed upward. The first open cavity 951 and the second open cavity 952 may be provided to extend to an edge of the pad 90 in a radial direction of the pad 90.

The first open cavity 951 may be provided to close the plurality of refrigerant inlet and outlet holes 82 and open an extending groove 825 of the boss 80 to be described later. In addition, the second open cavity 952 may be provided to open the extending groove 825 as well as the plurality of refrigerant inlet and outlet holes 82. Details of the first open cavity 951 and the second open cavity 952 will be described later.

The pad 90 may include a connection cavity 97 provided to selectively connect two adjacent refrigerant inlet and outlet holes among the plurality of refrigerant inlet and outlet holes 82 formed in the boss 80.

The connection cavity 97 may be formed in the lower portion of the pad 90. The connection cavity 97 may be provided on the lower surface of the pad 90 and formed in the form of a groove recessed upward. The connection cavity 97 may connect two adjacent refrigerant inlet and outlet holes among the plurality of refrigerant inlet and outlet holes 82.

The valve device 1 may further include a stator (not shown). The stator may be provided to surround a portion, in which the rotor 30 is arranged, from the outside of the case 10.

In addition, the valve device 1 may further include a bracket (not shown). The bracket may allow the case 10 and the stator to be coupled to each other. The bracket may allow the valve device 1 to be fixed to an external device.

Referring to FIG. 4, the boss 80 may include the plurality of refrigerant inlet and outlet holes 82 formed at a first position, which is spaced apart from the center, to communicate with the plurality of inlet and outlet pipes 200, respectively. In this case, being formed at the first position may mean that a center of the refrigerant inlet and outlet hole is formed at the first position.

The boss 80 may include the extending groove 825 connected to one of the plurality of refrigerant inlet and outlet holes 82 so as to extend radially outward from the first position to a second position.

The first position may be provided at a position away from the center of the boss 80 by a first distance R1 in a radial direction. Further, the second position may be provided at a position spaced apart from the center of the boss 80 by a second distance R2 in the radial direction. The second distance R2 may be greater than the first distance R1.

The extending groove 825 may include an opening member 8251 communicating with the accommodation space 11 by the first open cavity 951 of the pad 90 to receive a refrigerant. The extending groove 825 may include a connection member 8252 connected to the opening member 8251 to allow the refrigerant to flow into the refrigerant inlet and outlet hole.

Accordingly, that the extending groove 825 is formed at the second position may mean that the center of the opening member 8251 is formed at the second position.

That is, the refrigerant inlet and outlet hole may be formed at the first position, the opening member 8251 of the extending groove 825 may be formed at the second position, and the connection member 8252 of the extending groove 825 may extend between the first position and the second position.

The extending groove 825 may be formed by being recessed downward from the upper surface of the boss 80. Because the extending groove 825 does not completely penetrate the boss 80, the refrigerant introduced into the extending groove 825 may flow to a first refrigerant inlet and outlet hole 821 along the extending groove 825.

The pad 90 may include a sealing body 92.

The sealing body 92 may be provided in contact with the upper surface of the boss 80 to close the plurality of refrigerant inlet and outlet holes 82 and the extending groove 825 of the boss 80. The sealing body 92 may form a lower surface of the pad 90 and may be provided to protrude downward of the pad 90.

The pad 90 may include the first open cavity 951 and the second open cavity 952.

The first open cavity 951 and the second open cavity 952 may be cut from the outside of the pad 90 toward the inside of the pad 90. Particularly, the first open cavity 951 and the second open cavity 952 may be provided on one side of the sealing body 92.

The first open cavity 951 may be cut from the outside of the pad 90 toward the inside of the pad 90. The first open cavity 951 may be cut from the outside of the pad 90 to the second position in which the opening member 8251 of the boss 80 is arranged.

The second open cavity 952 may be cut from the outside to the inside of the pad 90. The second open cavity 952 may be cut from the outside of the pad 90 to the first position in which the plurality of refrigerant inlet and outlet holes 82 is arranged.

The first open cavity 951 may be provided to close the plurality of refrigerant inlet and outlet holes 82 and to open the opening member 8251 of the extending groove 825.

In addition, the second open cavity 952 may be provided to open the plurality of refrigerant inlet and outlet holes 82, the connection member 8252 and the opening member 8251 of the extending groove 825. The second open cavity 952 may have a size capable of selectively opening one of the plurality of refrigerant inlet and outlet holes 82. The second open cavity 952 may have a size incapable of simultaneously opening two refrigerant inlet and outlet holes 82 among the plurality of refrigerant inlet and outlet holes 82.

The first open cavity 951 and the second open cavity 952 of the pad 90 may be provided to communicate with the accommodation space 11 inside the case 10. Therefore, in a state in which the refrigerant flows into the accommodation space 11 through the refrigerant inlet pipe 100, the refrigerant may flow into the refrigerant inlet and outlet hole in response to opening the opening member 8251 of the extending groove 825 by the first open cavity 951.

In addition, in response to opening one of the plurality of refrigerant inlet and outlet holes 82 by the second open cavity 952, the refrigerant flowing into the accommodation space 11 may flow into one of the refrigerant inlet and outlet holes 82.

The pad 90 may include the connection cavity 97.

The connection cavity 97 may be formed at a position corresponding to the plurality of refrigerant inlet and outlet holes 82 of the boss 80. Particularly, the connection cavity 97 may be cut along the rotational direction of the pad 90 at the first position in which the plurality of refrigerant inlet and outlet holes 82 is formed. As described above, an opening angle of the connection cavity 97 may be provided to be approximately 90 degrees to open two adjacent refrigerant inlet and outlet holes among the plurality of refrigerant inlet and outlet holes 82.

FIGS. 8 to 14 are top views illustrating a state in which various modes are performed as the pad of the valve device according to an embodiment of the disclosure rotates on the top of the boss. FIG. 15 is a cross-sectional view schematically illustrating a state in which a simultaneous open mode is performed by the pad and the boss of FIG. 14.

Hereinafter a flow mode of the refrigerant according to the rotation of the pad 90 will be described with reference to FIGS. 8 to 14 and 15.

Referring to FIGS. 8 to 14, a refrigerant compressed in a compressor (not shown) may be transferred to a condenser C and then condensed. The refrigerant condensed in the condenser C may be transferred to capillary tubes CA1 and CA2 corresponding to expansion devices and then expanded. The refrigerant expanded in the capillary tubes CA1 and CA2 may be transferred to an evaporator E, and the refrigerant may generate cold air through the heat exchange in the evaporator E.

As for a refrigerator, the refrigerant condensed in the condenser C may be transferred to the capillary tubes CA1 and CA2. The refrigerant condensed in the condenser C may be directly transferred to the capillary tubes CA1 and CA2 or transferred to the capillary tubes CA1 and CA2 through a hot pipe H.

The hot pipe H may be a pipe that is installed to prevent the formation of dew on a gasket of a refrigerator door, which is a temperature-vulnerable part of the refrigerator. That is, a high-temperature refrigerant in a high-pressure part of the refrigeration cycle may pass through the hot pipe H to prevent the formation of dew on the gasket of the refrigerator door.

The hot pipe H only needs to maintain at a temperature greater than or equal to the dew point according to a humidity of the outside air, but when the temperature is maintained at the temperature greater than the dew point in the refrigerator, it acts as a heat load inside the refrigerator, thereby increasing the power consumption of the refrigerator. Therefore, according to operating conditions, the refrigerant condensed in the condenser C may be transferred to the capillary tubes CA1 and CA2 through the hot pipe H or directly transferred to the capillary tubes CA1 and CA2 without passing through the hot pipe H. For this, the valve device 1 may be installed to the outlet pipe through which the refrigerant condensed in the condenser C is discharged.

The capillary tubes CA1 and CA2 may include a first capillary tube CA1 and a second capillary tube CA2. The first capillary tube CA1 and the second capillary tube CA2 may have different inner diameters and different lengths. The first capillary tube CA1 may have a large inner diameter and a short length. That is, in a state in which the cooling load is high, it is possible to allow the refrigerant to flow into the first capillary tube CA1 having a small refrigerant flow resistance, and then to expand. The second capillary tube CA2 may have a smaller inner diameter and a longer length than that of the first capillary tube CA1. That is, in a state in which the cooling load is low, it is possible to allow the refrigerant to flow into the second capillary tube CA2 having a large refrigerant flow resistance and then to expand.

In addition, under a high load condition in which an external temperature or an internal temperature of the refrigerator is high, it may be required to increase a refrigerant flow rate to a maximum level in order to cool an internal space as quickly as possible. Accordingly, the refrigerant may flow into both the first capillary tube CA1 and the second capillary tube CA2 in order to secure the maximum refrigerant flow rate.

That is, by controlling the valve device 1 to allow the refrigerant to flow through the first capillary tube CA1 or the second capillary tube CA2 or allow the refrigerant to flow through both of the first capillary tube CA1 and the second capillary tube CA2 according to the cooling load, it is possible to perform efficient operation in a relatively wide cooling load range.

The refrigerant inlet pipe 100 may be connected to an outlet pipe of the condenser C. The refrigerant inlet pipe 100 may be connected to the accommodation space 11 inside the case 10 through the refrigerant inlet hole 23 (refer to FIGS. 2 and 7).

The boss 80 may include the first refrigerant inlet and outlet hole 821, a second refrigerant inlet and outlet hole 822, a third refrigerant inlet and outlet hole 823, and a fourth refrigerant inlet and outlet hole 824. The extending groove 825 may be provided to be connected to the first refrigerant inlet and outlet hole 821.

The second refrigerant inlet and outlet hole 822, the third refrigerant inlet and outlet hole 823, and the fourth refrigerant inlet and outlet hole 824 may be arranged to be spaced apart from each other at intervals of 90 degrees clockwise from the first refrigerant outlet hole 821 with respect to the center of the boss 80.

The plurality of inlet and outlet pipes 200 may include a first inlet and outlet pipe 210 connected to the first refrigerant inlet and outlet hole 821, a second inlet and outlet pipe 220 connected to the second refrigerant inlet and outlet hole 822, a third inlet and outlet pipe 230 connected to the third refrigerant inlet and outlet hole 823 and a fourth inlet and outlet pipe 240 connected to the fourth refrigerant inlet and outlet hole 824.

The first inlet and outlet pipe 210 and the third inlet and outlet pipe 230 may be connected to the hot pipe H. The refrigerant may flow into the first inlet and outlet pipe 210 and flow out to the third inlet and outlet pipe 230 through the hot pipe H. Alternatively, the refrigerant may flow into the third inlet and outlet pipe 230 and may flow out into the first inlet and outlet pipe 210 through the hot pipe H.

The fourth inlet and outlet pipe 240 may be connected to the first capillary tube CA1. The second inlet and outlet pipe 220 may be connected to the second capillary tube CA2.

Figure 8:
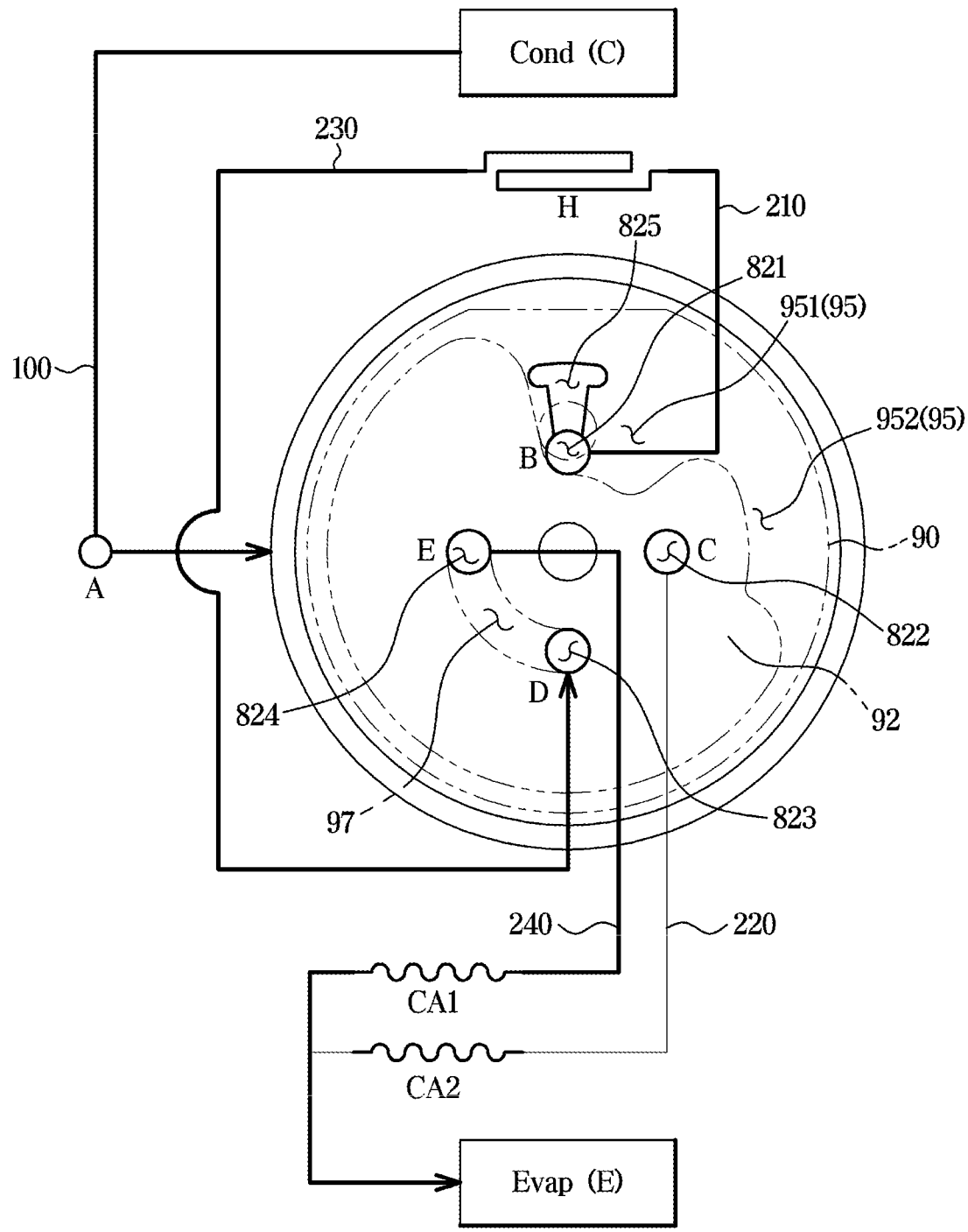
FIG. 8 is a top view illustrating a state in which various modes are performed as the pad of the valve device according to an embodiment of the disclosure rotates on the top of the boss.

As illustrated in FIG. 8, in response to the second open cavity 952 of the pad 90 being arranged at a position of opening the first refrigerant inlet and outlet hole 821, only the first refrigerant inlet and outlet hole 821 may be opened by the second open cavity 952.

The second refrigerant inlet and outlet hole 822 may be closed by the pad 90. Particularly, the second refrigerant inlet and outlet hole 822 may be closed by the sealing body 92 of the pad 90. The third refrigerant inlet and outlet hole 823 and the fourth refrigerant inlet and outlet hole 824 may be connected through the connection cavity 97 of the pad 90.

Accordingly, the refrigerant introduced into the refrigerant inlet pipe 100 from the condenser C may be introduced into the accommodation space 11 through the refrigerant inlet hole 23. The introduced refrigerant may flow out to the first inlet and outlet pipe 210 through the first refrigerant inlet and outlet hole 821 opened by the second open cavity 952 of the pad 90. The refrigerant flowing out to the first inlet and outlet pipe 210 may be introduced into the third inlet and outlet pipe 230 through the hot pipe H. The refrigerant introduced into the third inlet and outlet pipe 230 may flow out to the fourth inlet and outlet pipe 240 through the fourth refrigerant inlet and outlet hole 824 connected to the third refrigerant inlet and outlet hole 823 by the connection cavity 97. The refrigerant flowing out to the fourth inlet and outlet pipe 240 may be introduced into the first capillary tube CA1. The refrigerant introduced into the first capillary tube CA1 and expanded may be transferred to the evaporator E, and may generate cold air through the heat exchange in the evaporator E.

FIG. 8 illustrates that the first capillary tube CA1 and the second capillary tube CA2 are connected to a single evaporator E, but is not limited thereto. That is, two evaporators E may be provided. Based on two evaporators E being provided, the first capillary tube CA1 and the second capillary tube CA2 may be connected to a different evaporator E, respectively.

Figure 9:
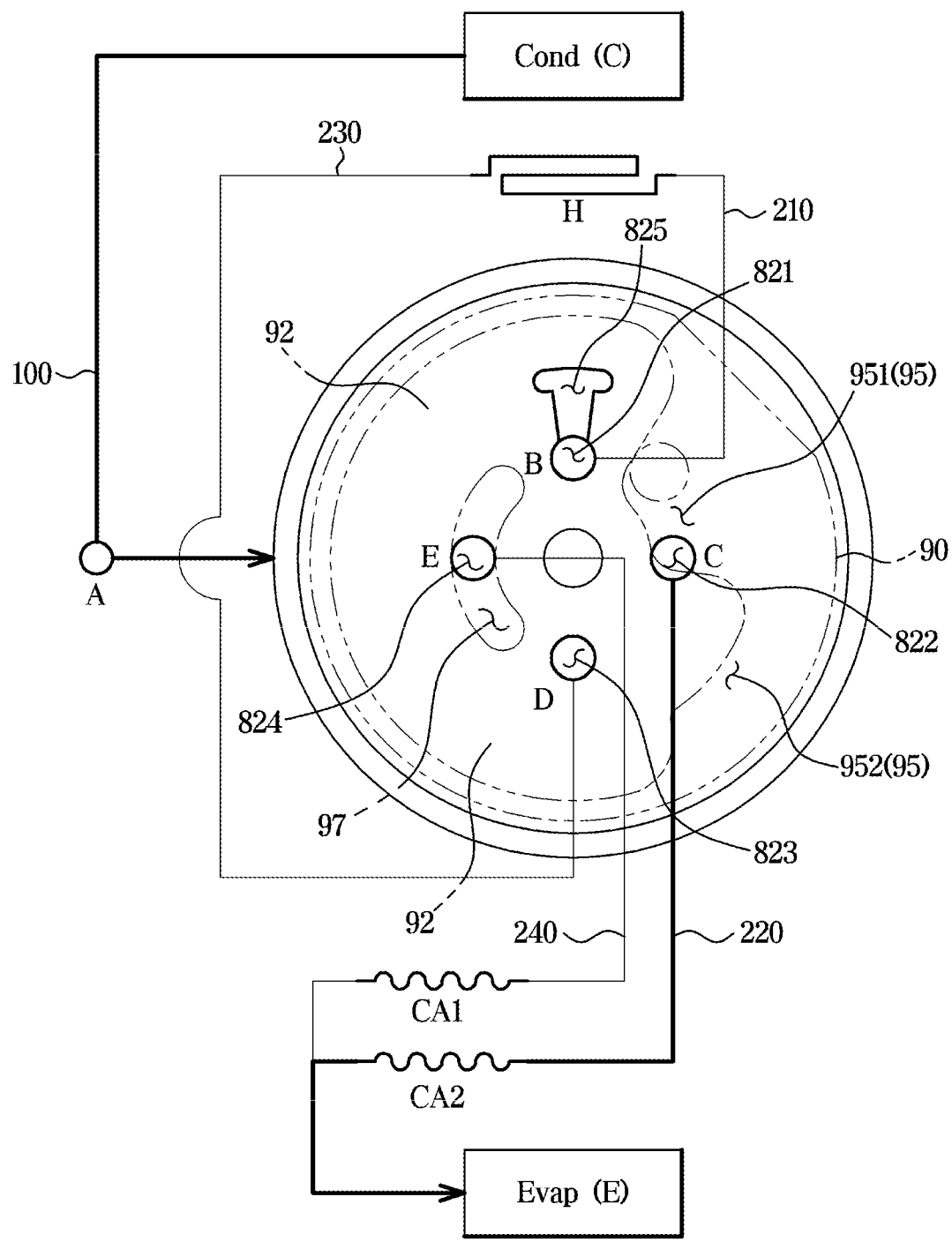
FIG. 9 is a top view illustrating the state in which various modes are performed as the pad of the valve device according to an embodiment of the disclosure rotates on the top of the boss.

As illustrated in FIG. 9, in response to the pad 90 rotating at a predetermined angle in the clockwise direction with respect to the center of the boss 80 in the state of FIG. 8, the refrigerant condensed in the condenser C may be introduced into the second capillary tube CA2 without passing through the hot pipe H, and then expanded. The refrigerant expanded in the second capillary tube CA2 may be transferred to the evaporator E, and may generate cold air through the heat exchange in the evaporator E.

The second open cavity 952 of the pad 90 may be positioned to open the second refrigerant inlet and outlet hole 822. In response to the second open cavity 952 being arranged at a position of the second refrigerant inlet and outlet hole 822, the second refrigerant inlet and outlet hole 822 may be opened by the second open cavity 952. The first refrigerant inlet and outlet hole 821 and the third refrigerant inlet and outlet hole 823 may be closed by the pad 90.

The refrigerant introduced from the condenser C to the refrigerant inlet pipe 100 may be introduced into the accommodation space 11 through the refrigerant inlet hole 23. The introduced refrigerant may flow out to the second inlet and outlet pipe 220 through the second refrigerant inlet and outlet hole 822 opened by the second open cavity 952 of the pad 90. The refrigerant flowing out to the second inlet and outlet pipe 220 may be introduced into the second capillary tube CA2. The refrigerant introduced into the second capillary tube CA2 and expanded may be transferred to the evaporator E, and may generate cold air through the heat exchange in the evaporator E.

FIG. 9 illustrates that the first capillary tube CA1 and the second capillary tube CA2 are connected to a single evaporator E, but is not limited thereto. That is, two evaporators E may be provided. Based on two evaporators E being provided, the first capillary tube CA1 and the second capillary tube CA2 may be connected to a different evaporator E, respectively. In this case, because the first refrigerant inlet and outlet hole 821 and the third refrigerant inlet and outlet hole 823 are closed, the refrigerant may be prevented from flowing into the first inlet and outlet pipe 210 and the third inlet and outlet pipe 230.

Figure 10:
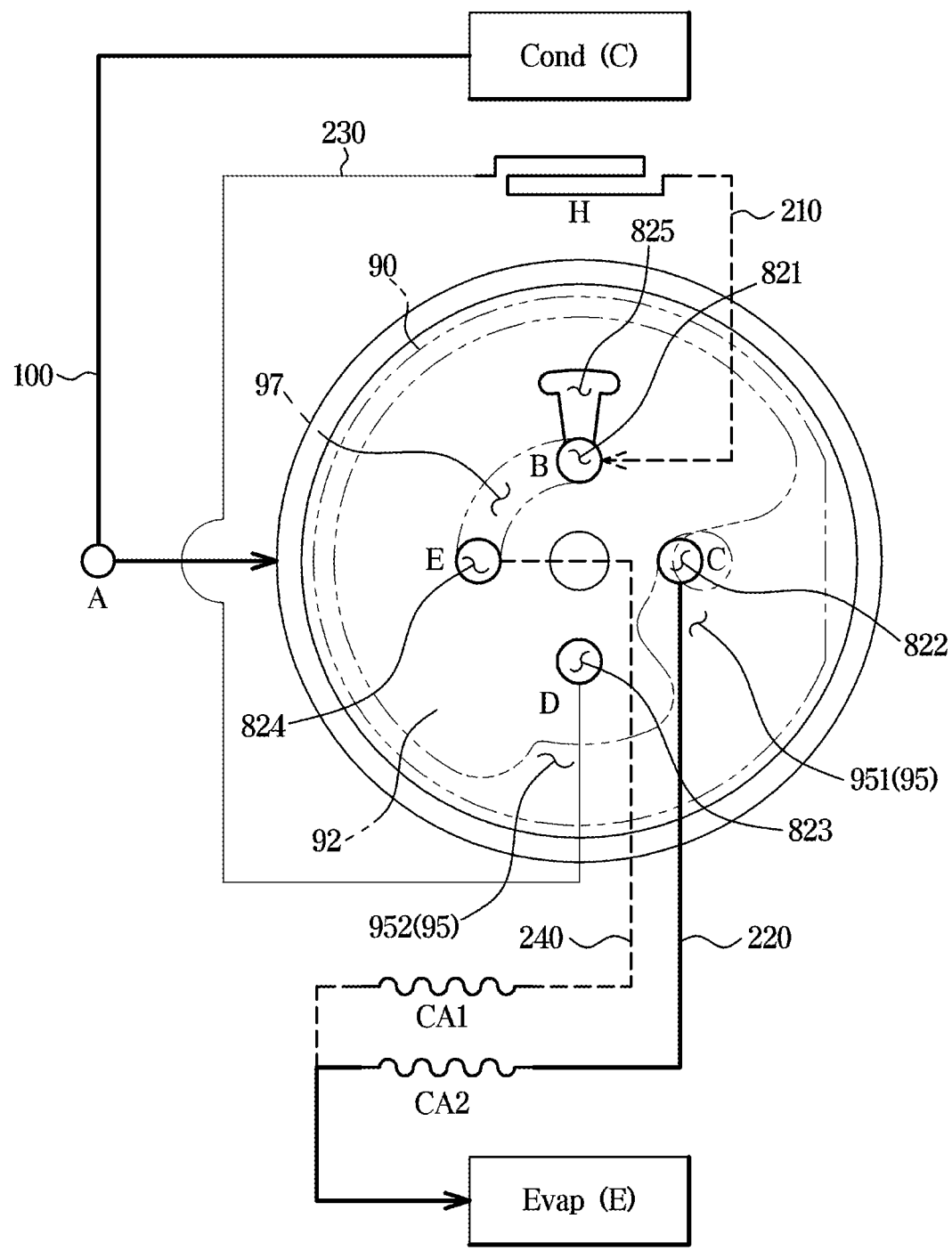
FIG. 10 is a top view illustrating the state in which various modes are performed as the pad of the valve device according to an embodiment of the disclosure rotates on the top of the boss.

As illustrated in FIG. 10, in response to the pad 90 rotating at a predetermined angle in the clockwise direction with respect to the center of the boss 80 in the state of FIG. 9, the refrigerant condensed in the condenser C may be introduced into the second capillary tube CA2 without passing through the hot pipe H, and then expanded, which is the same as the flow of the refrigerant shown in FIG. 9.

However, as the connection cavity 97 of the pad 90 is arranged to connect the first refrigerant inlet and outlet hole 821 to the fourth refrigerant inlet and outlet hole 824, the refrigerant remaining in the first inlet and outlet pipe 210 connected to the first refrigerant inlet and outlet hole 821 may be recovered through the fourth inlet and outlet pipe 240. The recovered refrigerant may pass through the first capillary tube CA1 and be mixed with the refrigerant passing through the second capillary tube CA2, thereby flowing into the evaporator E.

Figure 11:
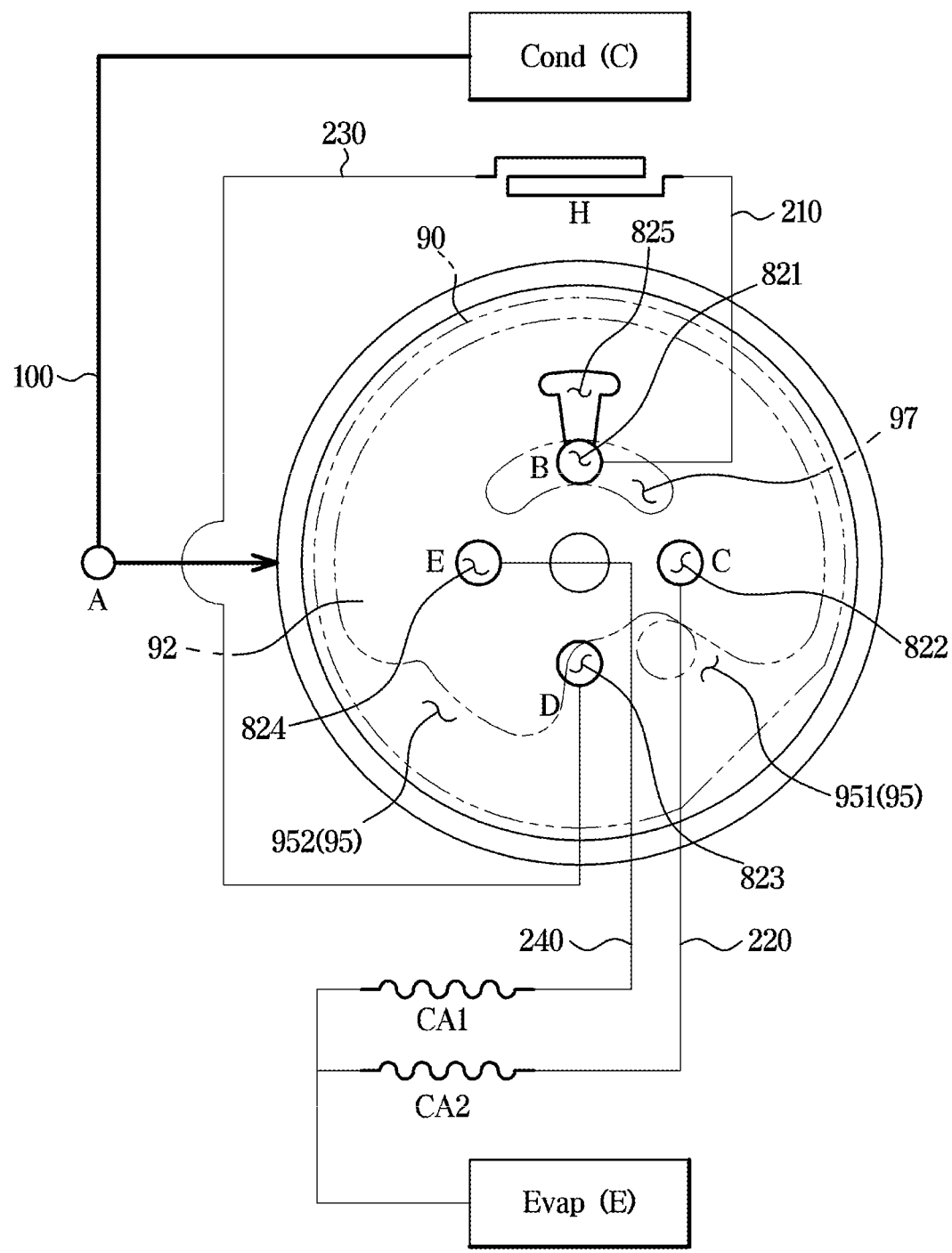
FIG. 11 is a top view illustrating the state in which various modes are performed as the pad of the valve device according to an embodiment of the disclosure rotates on the top of the boss.

As illustrated in FIG. 11, in response to the pad 90 rotating at a predetermined angle in the clockwise direction with respect to the center of the boss 80 in the state of FIG. 10, the refrigerant condensed in the condenser C may not flow.

Particularly, the second open cavity 952 of the pad 90 may be positioned to open the third refrigerant inlet and outlet hole 823. At the same time, the pad 90 may be positioned to close the second refrigerant inlet and outlet hole 822 and the fourth refrigerant inlet and outlet hole 824. The connection cavity 97 of the pad 90 may communicate with the first refrigerant inlet and outlet hole 821.

The third inlet and outlet pipe 230 connected to the third refrigerant inlet and outlet hole 823 may be connected to the first inlet and outlet pipe 210 connected to the first refrigerant inlet and outlet hole 821 through the hot pipe H. However, because the connection cavity 97 does not communicate with the outside, the first refrigerant inlet and outlet hole 821 is provided in a closed state.

Therefore, the refrigerant may not flow to any of the plurality of inlet and outlet pipes 200.

Figure 12:
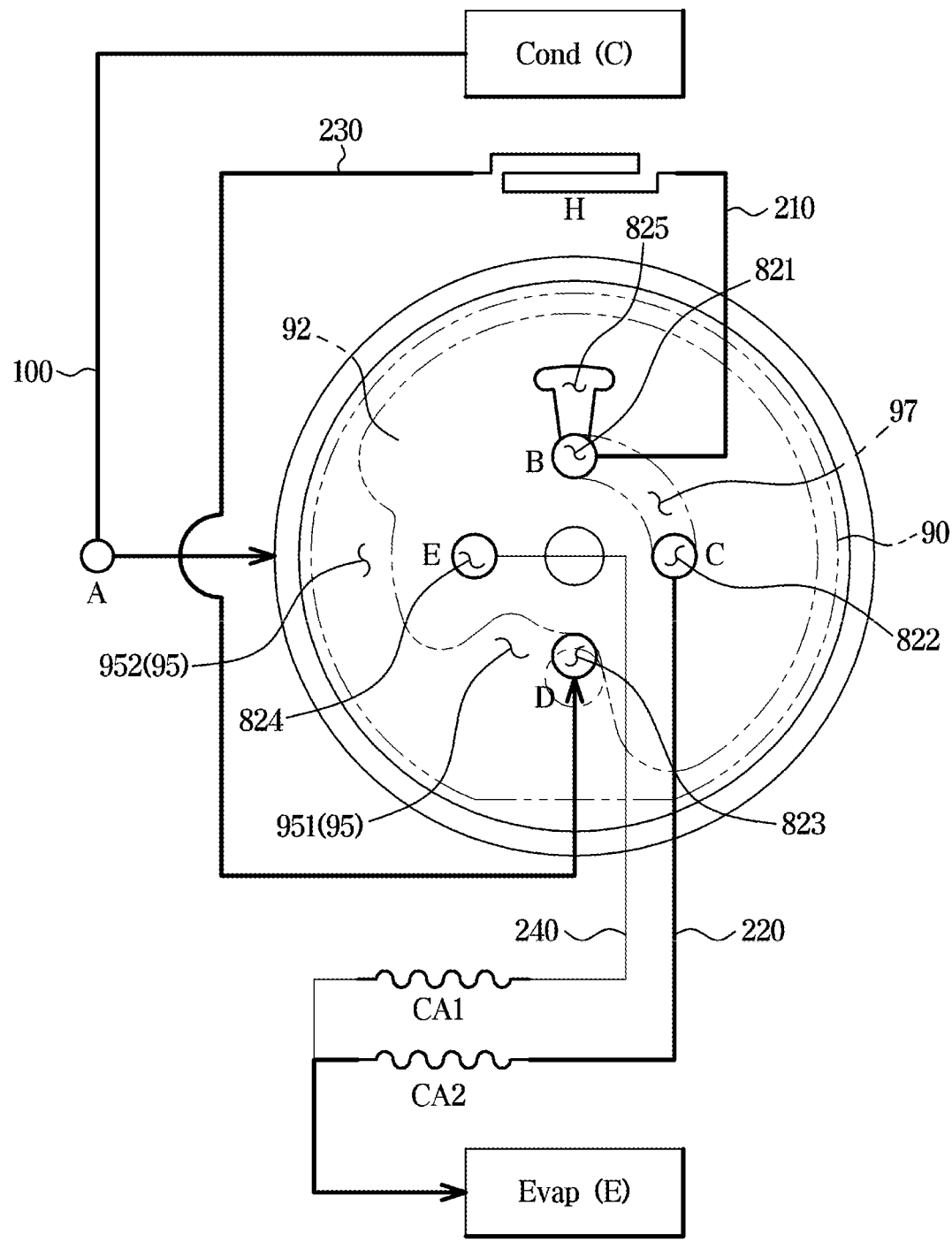
FIG. 12 is a top view illustrating the state in which various modes are performed as the pad of the valve device according to an embodiment of the disclosure rotates on the top of the boss.

As illustrated in FIG. 12, in response to the pad 90 rotating at a predetermined angle in the clockwise direction with respect to the center of the boss 80 in the state of FIG. 11, the refrigerant condensed in the condenser C may be introduced into the second capillary tube CA2 by passing through the hot pipe H, and then expanded. The refrigerant expanded in the second capillary tube CA2 may be transferred to the evaporator E, and may generate cold air through the heat exchange in the evaporator E.

Referring to FIG. 12, the second open cavity 952 of the pad 90 may be arranged at a position of the third refrigerant inlet and outlet hole 823. In this case, the third refrigerant inlet and outlet hole 823 may be opened by the second open cavity 952. The fourth refrigerant inlet and outlet hole 824 may be closed by the pad 90. The first refrigerant inlet and outlet hole 821 and the second refrigerant inlet and outlet hole 822 may be connected by the connection cavity 97.

The refrigerant introduced from the condenser C to the refrigerant inlet pipe 100 may be introduced into the accommodation space 11 through the refrigerant inlet hole 23. The introduced refrigerant may be introduced into the third inlet and outlet pipe 230 through the third refrigerant inlet and outlet hole 823 opened by the second open cavity 952 of the pad 90. The refrigerant flowing out to the third inlet and outlet pipe 230 may be introduced into the first inlet and outlet pipe 210 through the hot pipe H.

The refrigerant introduced into the first inlet and outlet pipe 210 may flow out to the second inlet and outlet pipe 220 through the second refrigerant inlet and outlet hole 822 connected to the first refrigerant inlet and outlet hole 821 by the connection cavity 97. The refrigerant flowing out to the second inlet and outlet pipe 220 may be introduced into the second capillary tube CA2. The refrigerant introduced into the second capillary tube CA2 and expanded may be transferred to the evaporator E, and may generate cold air through the heat exchange in the evaporator E.

FIG. 12 illustrates that the first capillary tube CA1 and the second capillary tube CA2 are connected to a single evaporator E, but is not limited thereto. That is, two evaporators E may be provided. Based on two evaporators E being provided, the first capillary tube CA1 and the second capillary tube CA2 may be connected to a different evaporator E, respectively.

Figure 13:
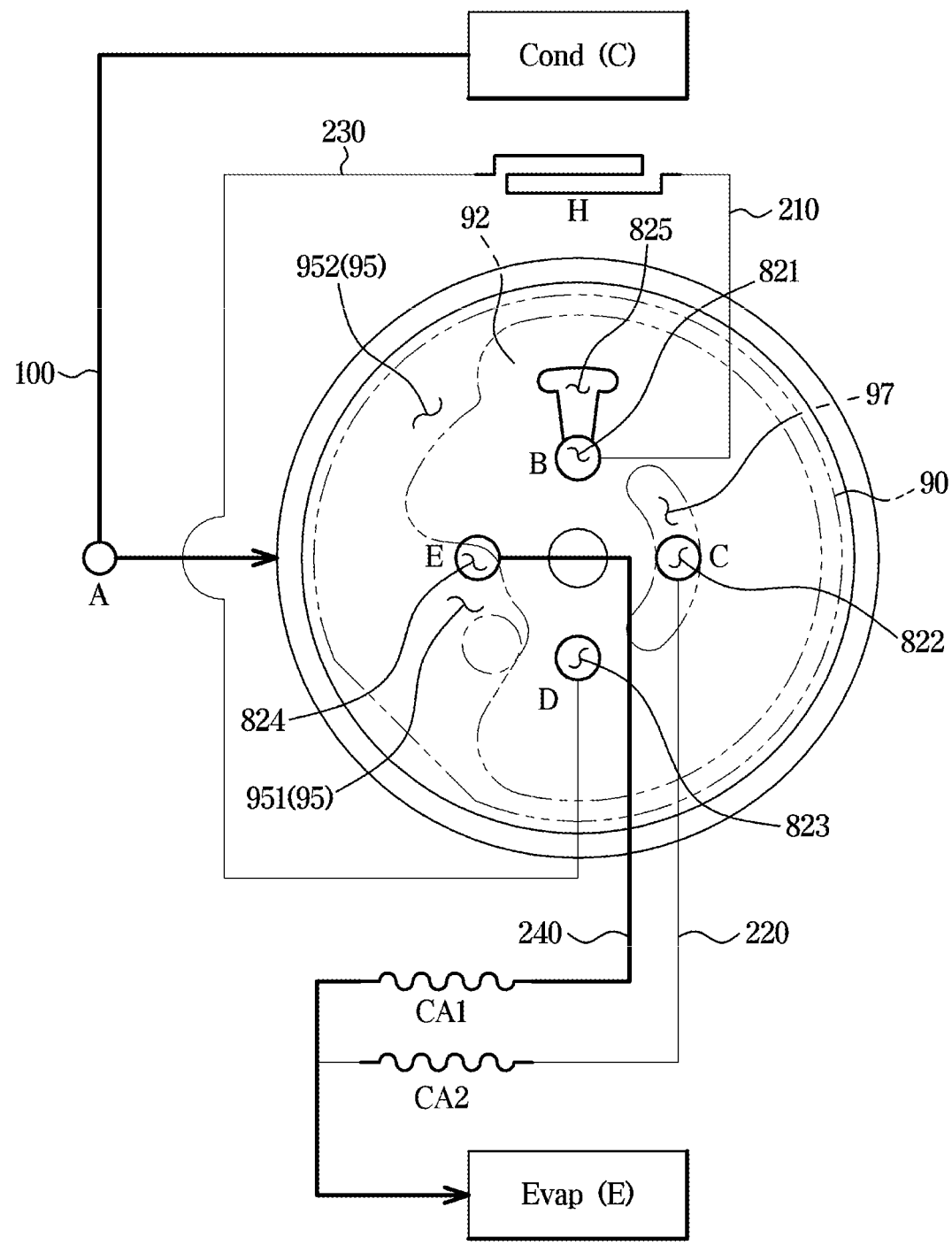
FIG. 13 is a top view illustrating the state in which various modes are performed as the pad of the valve device according to an embodiment of the disclosure rotates on the top of the boss.

As illustrated in FIG. 13, the refrigerant condensed in the condenser C may be introduced into the first capillary tube CA1 without passing through the hot pipe H, and then expanded. The refrigerant expanded in the first capillary tube CA1 may be transferred to the evaporator E, and may generate cold air through the heat exchange in the evaporator E.

In response to the pad 90 rotating at a predetermined angle in the clockwise direction with respect to the center of the boss 80 in the state of FIG. 12, the second open cavity 952 may be arrange at a position of the fourth refrigerant inlet and outlet hole 824. That is, the fourth refrigerant inlet and outlet hole 824 may be opened by the second open cavity 952. The first refrigerant inlet and outlet hole 821 and the third refrigerant inlet and outlet hole 823 may be closed by the pad 90.

The refrigerant introduced from the condenser C to the refrigerant inlet pipe 100 may be introduced into the accommodation space 11 through the refrigerant inlet hole 23. The introduced refrigerant may flow out to the fourth inlet and outlet pipe 240 through the fourth refrigerant inlet and outlet hole 824 opened by the second open cavity 952 of the pad 90. The refrigerant flowing out to the fourth inlet and outlet pipe 240 may be introduced into the first capillary tube CA1. The refrigerant introduced into the first capillary tube CA1 and expanded may be transferred to the evaporator E, and may generate cold air through the heat exchange in the evaporator E.

FIG. 13 illustrates that the first capillary tube CA1 and the second capillary tube CA2 are connected to a single evaporator E, but is not limited thereto. That is, two evaporators E may be provided. Based on two evaporators E being provided, the first capillary tube CA1 and the second capillary tube CA2 may be connected to a different evaporator E, respectively. In this case, because the first refrigerant inlet and outlet hole 821 and the third refrigerant inlet and outlet hole 823 are closed, the refrigerant may be prevented from flowing into the first inlet and outlet pipe 210 and the third inlet and outlet pipe 230.

Figure 14:
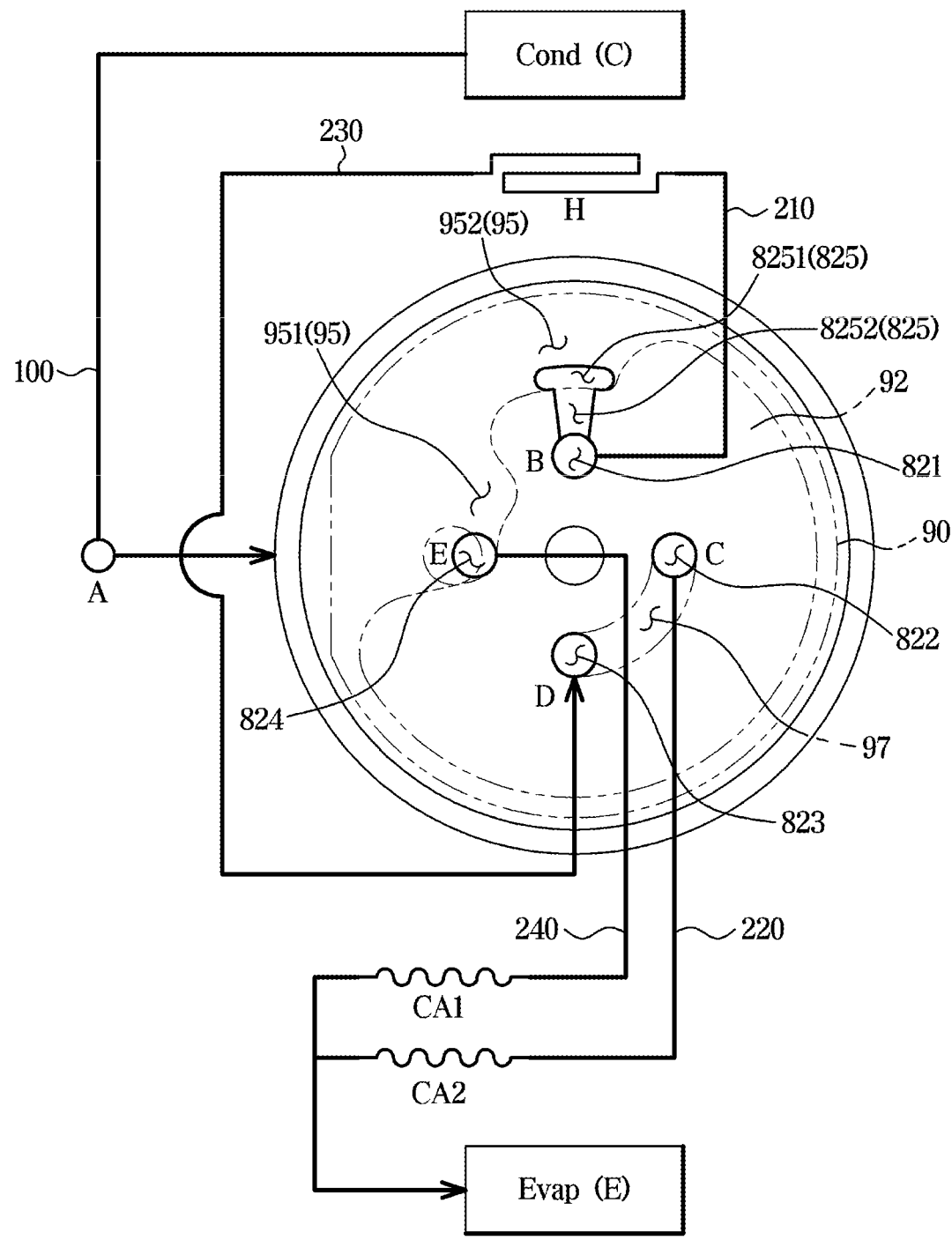
FIG. 14 is a top view illustrating the state in which various modes are performed as the pad of the valve device according to an embodiment of the disclosure rotates on the top of the boss.
Figure 15:
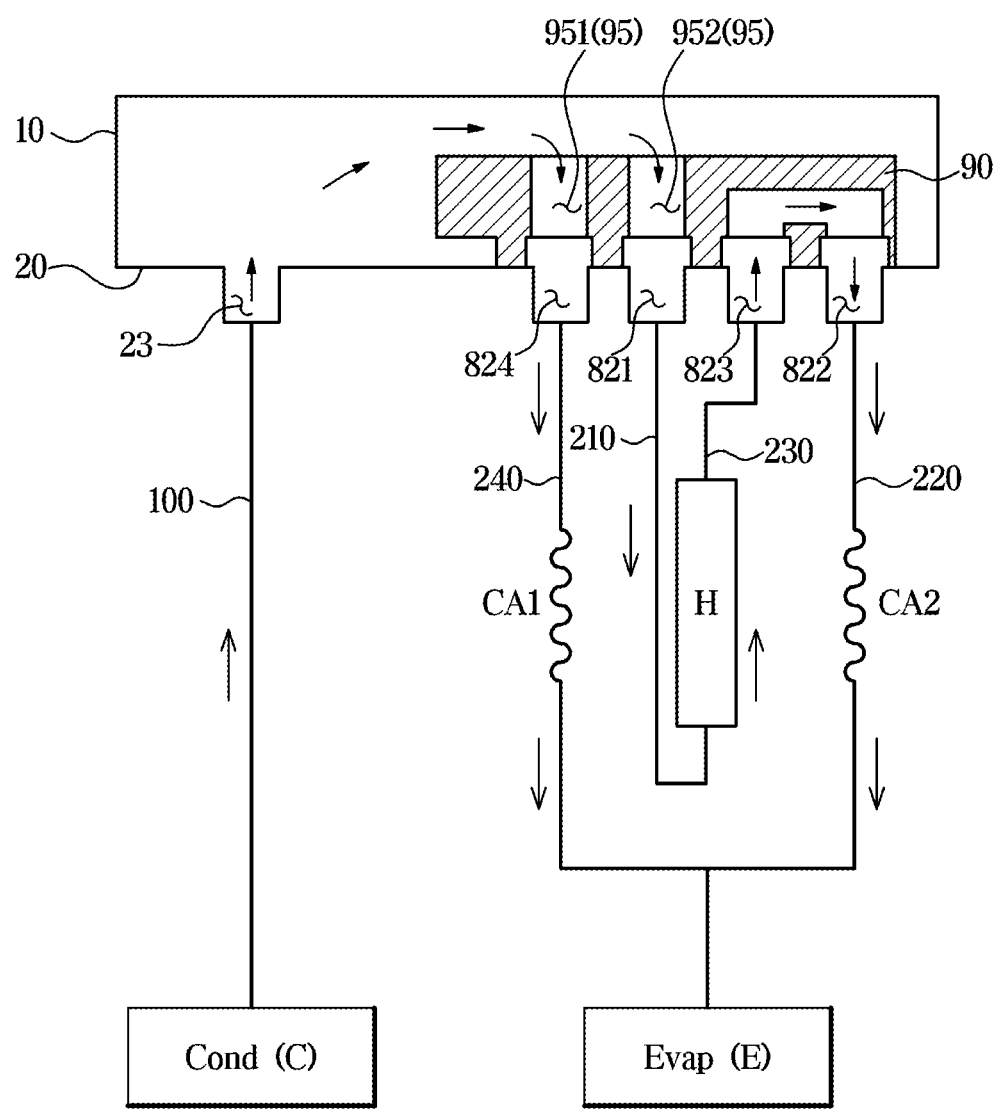
FIG. 15 is a cross-sectional view schematically illustrating a state in which a simultaneous open mode is performed by the pad and the boss of FIG. 14.

As illustrated in FIGS. 14 and 15, the refrigerant condensed in the condenser C may be introduced into the first capillary tube CA1 and the second capillary tube CA2 by passing through the hot pipe H, and then expanded. The refrigerant expanded in the first capillary tube CA1 and the second capillary tube CA2 may be transferred to the evaporator E, and may generate cold air through the heat exchange in the evaporator E.

In response to the pad 90 rotating at a predetermined angle in the clockwise direction with respect to the center of the boss 80 in the state of FIG. 13, the first open cavity 951 may be arranged at a position of the opening member 8251 of the extending groove 825 and the second open cavity 952 may be arranged at a position of the fourth refrigerant inlet and outlet hole 824. That is, the opening member 8251 of the extending groove 825 may be opened by the first open cavity 951, and the fourth refrigerant inlet and outlet hole 824 may be opened by the second open cavity 952. The third refrigerant inlet and outlet hole 823 may be connected to the fourth refrigerant inlet and outlet hole 824 by the connection cavity 97 of the pad 90.

The refrigerant introduced from the condenser C to the refrigerant inlet pipe 100 may be introduced into the accommodation space 11 through the refrigerant inlet hole 23.

The introduced refrigerant may flow to the first refrigerant inlet and outlet hole 821 through the extending groove 825 opened by the first open cavity 951 of the pad 90. Particularly, the opening member 8251 of the extending groove 825 may be opened by the first open cavity 951, and the refrigerant may flow through the connection member 8252 connected to the opening member 8251. The refrigerant flowing to the connection member 8252 may flow into the first refrigerant inlet and outlet hole 821 and then may flow out to the first inlet and outlet pipe 210 connected to the first refrigerant inlet and outlet hole 821.

The refrigerant flowing out to the first inlet and outlet pipe 210 may flow to the third inlet and outlet pipe 230 through the hot pipe H. The refrigerant flowing out to the third refrigerant inlet and outlet hole 823 through the third inlet and outlet pipe 230 may flow to the second refrigerant inlet and outlet hole 822 connected through the connection cavity 97 and flow to the second inlet and outlet pipe 220.

The refrigerant flowing to the second inlet and outlet pipe 220 may be introduced into the second capillary tube CA2. The refrigerant introduced into the second capillary tube CA2 and expanded may be transferred to the evaporator E, and may generate the cold air through heat exchange in the evaporator E.

At the same time, the refrigerant flowing into the accommodation space 11 may flow out to the fourth inlet and outlet pipe 240 through the fourth refrigerant inlet and outlet hole 824 opened by the second open cavity 952 of the pad 90. The refrigerant flowing out to the fourth inlet and outlet pipe 240 may be introduced into the first capillary tube CA1. The refrigerant introduced into the first capillary tube CA1 and expanded may be transferred to the evaporator E, and may generate the cold air through heat exchange in the evaporator E.

FIGS. 14 and 15 illustrate that the first capillary tube CA1 and the second capillary tube CA2 are connected to a single evaporator E, but is not limited thereto. That is, two evaporators E may be provided. Based on two evaporators E being provided, the first capillary tube CA1 and the second capillary tube CA2 may be connected to a different evaporator E, respectively. In this case, because the first refrigerant inlet and outlet hole 821 and the third refrigerant inlet and outlet hole 823 are closed, the refrigerant may be prevented from flowing into the first inlet and outlet pipe 210 and the third inlet and outlet pipe 230.

Therefore, in the mode according to FIGS. 14 and 15, the simultaneous open mode, in which the refrigerant flows into both the first capillary tube CA1 and the second capillary tube CA2, is performed and the refrigerant passes through the hot pipe H.

Figure 16:
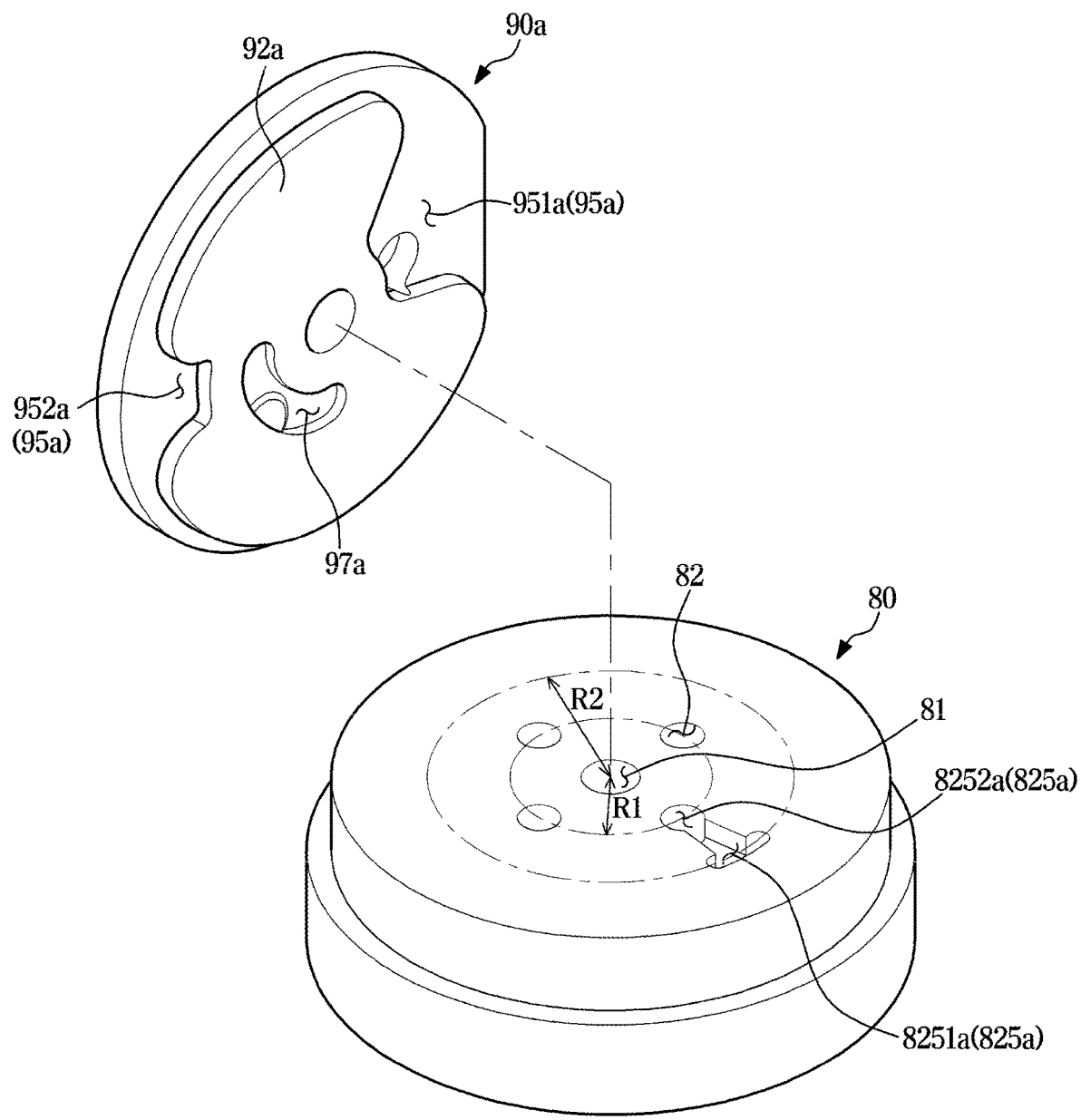
FIG. 16 is a view illustrating a pad and a boss according to another embodiment of the valve device according to an embodiment of the disclosure.
Figure 17:
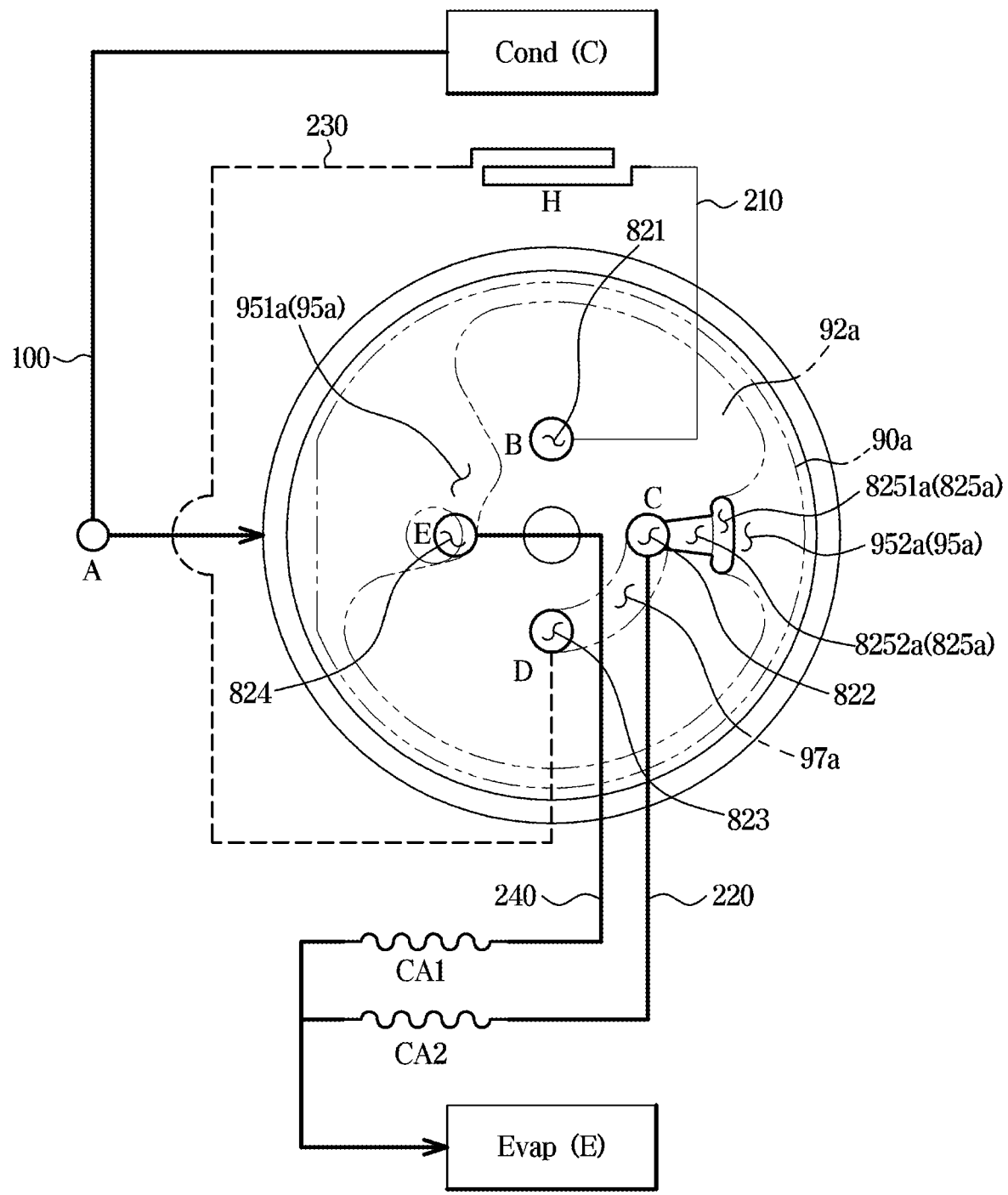
FIG. 17 is a top view illustrating a state in which a simultaneous open mode is performed by the pad and the boss of FIG. 16.

FIG. 16 is a view illustrating a pad and a boss according to another embodiment of the valve device according to an embodiment of the disclosure. FIG. 17 is a top view illustrating a state in which a simultaneous open mode is performed by the pad and the boss of FIG. 16.

As illustrated in FIGS. 16 and 17, the boss 80 may include the plurality of refrigerant inlet and outlet holes 82 formed at the first position spaced apart from the center to communicate with the plurality of inlet and outlet pipes 200, respectively. In this case, being formed at the first position may mean that the center of the refrigerant inlet and outlet hole is formed at the first position.

The boss 80 may include an extending groove 825a connected to one of the plurality of refrigerant inlet and outlet holes 82 so as to extend radially outward from the first position to the second position.

The first position may be provided at a position away from the center of the boss 80 by a first distance R1 in a radial direction. Further, the second position may be provided at a position spaced apart from the center of the boss 80 by a second distance R2 in the radial direction. The second distance R2 may be greater than the first distance R1.

The extending groove 825a may include an opening member 8251a communicating with the accommodation space 11 by a second open cavity 952a of a pad 90a to receive a refrigerant. The extending groove 825a may include a connection member 8252a connected to the opening member 8251a to allow the refrigerant to flow into the refrigerant inlet and outlet hole.

Accordingly, that the extending groove 825a is formed at the second position may mean that the center of the opening member 8251a is formed at the second position.

That is, the refrigerant inlet and outlet hole may be formed at the first position, the opening member 8251a of the extending groove 825a may be formed at the second position. The connection member 8252a of the extending groove 825a may extend between the first position and the second position.

The extending groove 825a may be formed by being recessed downward from the upper surface of the boss 80. Because the extending groove 825a does not completely penetrate the boss 80, the refrigerant introduced into the extending groove 825a may flow to the second refrigerant inlet and outlet hole 822 along the extending groove 825a.

The boss 80 according to another embodiment of the valve device according to an embodiment of the disclosure may be provided such that the extending groove 825a is connected to the second refrigerant inlet and outlet hole 822, unlike the boss 80 according to an embodiment. This is because the second open cavity 952a and a first open cavity 951a of the pad 90a, which will be described later, are separately formed.

The pad 90 may include a sealing body 92a.

The sealing body 92a may be provided in contact with the upper surface of the boss 80 to close the plurality of refrigerant inlet and outlet holes 82 and the extending groove 825a of the boss 80. The sealing body 92a may form a lower surface of the pad 90a and may be provided to protrude downward of the pad 90a.

The pad 90a may include the second open cavity 952a and the first open cavity 951a.

The second open cavity 952a and the first open cavity 951a may be cut from the outside of the pad 90a toward the inside of the pad 90a. Particularly, the second open cavity 952a and the first open cavity 951a may be provided on one side and the other side of the sealing body 92a, respectively.

The second open cavity 952a may be cut from the outside of the pad 90a toward the inside of the pad 90a. The second open cavity 952a may be cut from the outside of the pad 90a to the second position in which the opening member 8251a of the boss 80 is arranged.

The first open cavity 951a may be cut from the outside to the inside of the pad 90a. The first open cavity 951a may be cut from the outside of the pad 90a to the first position in which the plurality of refrigerant inlet and outlet holes 82 is arranged.

The second open cavity 952a may be provided to close the plurality of refrigerant inlet and outlet holes 82 and to open the opening member 8251a of the extending groove 825a.

In addition, the first open cavity 951a may be provided to open the plurality of refrigerant inlet and outlet holes 82, the connection member 8252a and the opening member 8251a of the extending groove 825a. The first open cavity 951a may have a size capable of selectively opening one of the plurality of refrigerant inlet and outlet holes 82. The first open cavity 951a may have a size incapable of simultaneously opening two refrigerant inlet and outlet holes among the plurality of refrigerant inlet and outlet holes 82.

The second open cavity 952a and the first open cavity 951a of the pad 90a may be provided to communicate with the accommodation space 11 inside the case 10. Therefore, in a state in which the refrigerant flows into the accommodation space 11 through the refrigerant inlet pipe 100, the refrigerant may flow into the refrigerant inlet and outlet hole in response to opening the opening member 8251a of the extending groove 825a by the second open cavity 952a.

In addition, in response to opening one of the plurality of refrigerant inlet and outlet holes 82 by the first open cavity 951a, the refrigerant flowing into the accommodation space 11 may flow into one of the refrigerant inlet and outlet holes 82.

Unlike the pad 90a according to an embodiment of the disclosure, the second open cavity 952a and the first open cavity 951a may be formed separately in the pad 90a according to another embodiment of the valve device according to an embodiment of the disclosure. Particularly, the second open cavity 952a and the first open cavity 951a may be formed at positions facing each other. The second open cavity 952*a* and the first open cavity 951*a* may be provided not to be connected to each other.

The pad 90 may include a connection cavity 97*a*.

The connection cavity 97*a* may be formed at a position corresponding to the plurality of refrigerant inlet and outlet holes 82 of the boss 80. Particularly, the connection cavity 97*a* may be cut along the rotational direction of the pad 90*a* at the first position in which the plurality of refrigerant inlet and outlet holes 82 is formed. As described above, an opening angle of the connection cavity 97*a* may be provided to be approximately 90 degrees to open two adjacent refrigerant inlet and outlet holes among the plurality of refrigerant inlet and outlet holes 82.

As illustrated in FIG. 17, in the simultaneous open mode, the refrigerant introduced through the refrigerant inlet pipe 100 may flow through the first capillary tube CA1 and the second capillary tube CA2, but bypass the hot pipe H.

In this case, the first cavity may be positioned to open the opening member 8251*a* of the extending groove 825*a* connected to the second refrigerant inlet and outlet hole 822. Further, the second cavity may be positioned to open the fourth refrigerant inlet and outlet hole 824. The second refrigerant inlet and outlet hole 822 and the third inlet and outlet hole may be connected through the connection cavity 97*a*. The first refrigerant inlet and outlet hole 821 may be provided to be closed by the sealing body 92*a* of the pad 90*a*.

Accordingly, the refrigerant flowing into the accommodation space 11 inside the case 10 through the refrigerant inlet pipe 100 may be introduced into the second refrigerant inlet and outlet hole 822 by passing through the connection member 8252*a* through the opening member 8251*a* of the extending groove 825*a* opened by the second open cavity 952*a*. The refrigerant introduced into the second refrigerant inlet and outlet hole 822 may flow into the second capillary tube CA2 through the second inlet and outlet pipe 220. Although the second refrigerant inlet and outlet hole 822 and the third refrigerant inlet and outlet hole 823 are connected by the connection cavity 97*a*, the refrigerant may not flow into the third refrigerant inlet and outlet hole 823 because the third refrigerant inlet and outlet hole 823, and the first refrigerant inlet and outlet hole 821 connected to the third inlet and outlet pipe 230, the hot pipe H, and the first inlet and outlet pipe 210 are closed.

In addition, the refrigerant flowing into the accommodation space 11 inside the case 10 through the refrigerant inlet pipe 100 may be introduced into the fourth refrigerant inlet and outlet hole 824 opened by the first open cavity 951*a*, and the refrigerant introduced into the fourth refrigerant inlet and outlet hole 824 may flow into the first capillary tube CA1 through the fourth inlet and outlet pipe 240.

The refrigerant introduced into the first capillary tube CA1 and the second capillary tube CA2 and expanded may be transferred to the evaporator E, and may generate cold air through the heat exchange in the evaporator E.

FIG. 17 illustrates that the first capillary tube CA1 and the second capillary tube CA2 are connected to a single evaporator E, but is not limited thereto. That is, two evaporators E may be provided. Based on two evaporators E being provided, the first capillary tube CA1 and the second capillary tube CA2 may be connected to a different evaporator E, respectively Therefore, in the mode illustrated in FIGS. 16 and 17, the simultaneous open mode, in which the refrigerant flows into both the first capillary tube CA1 and the second capillary tube CA2, is performed, and the refrigerant may bypass the hot pipe H.

Accordingly, as a single valve device, the valve device according to an embodiment of the disclosure may selectively pass or bypass the hot pipe H while performing the simultaneous open mode of using both of the first capillary tube CA1 and the second capillary tube CA2.

Accordingly, it is possible to simplify the structure of the pipe, and thus it is possible to increase cost reduction and space utilization.

Figure 18:
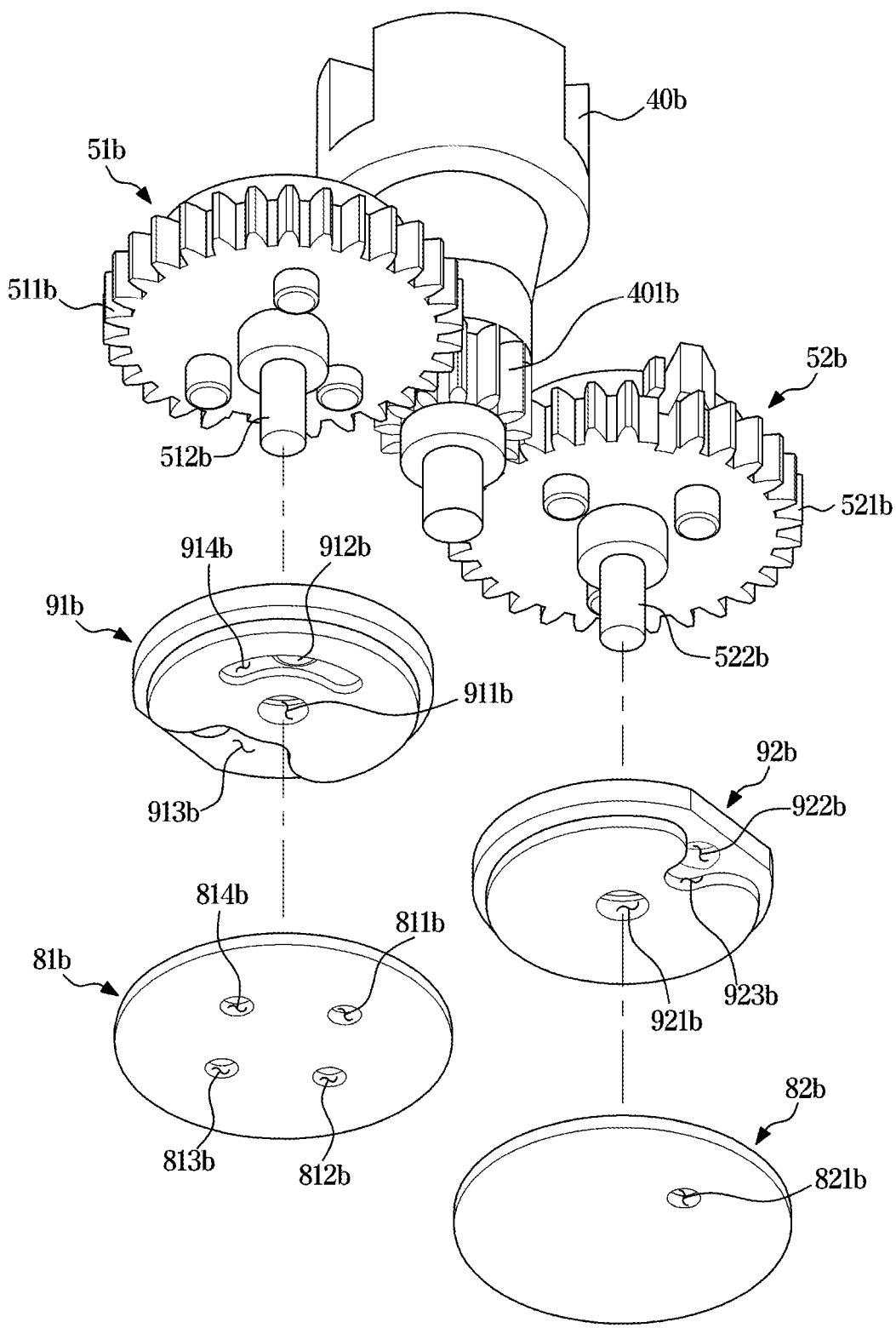
FIG. 18 is an exploded perspective view illustrating a partial configuration of the valve device according to another embodiment of the disclosure.
Figure 19:
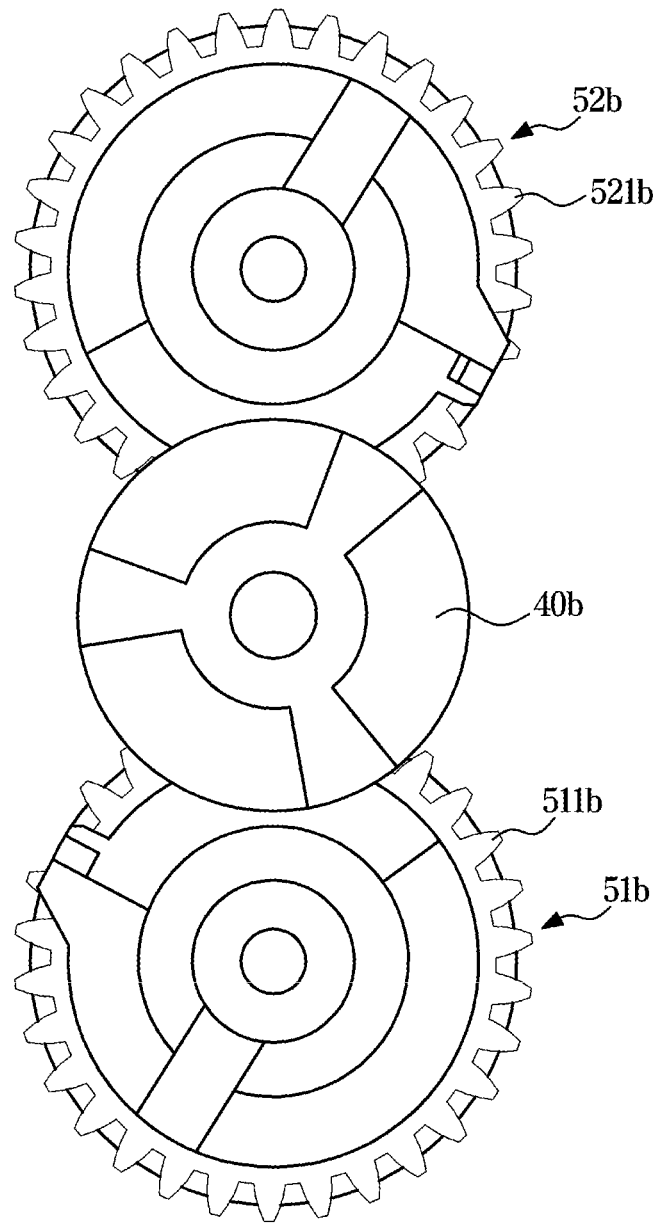
FIG. 19 is a top view illustrating a pinion gear, a first pad gear, and a second pad gear of FIG. 18.

FIG. 18 is an exploded perspective view illustrating a partial configuration of the valve device according to another embodiment of the disclosure. FIG. 19 is a top view illustrating a pinion gear, a first pad gear, and a second pad gear of FIG. 18.

As illustrated in FIGS. 18 and 19, the valve device may include a pinion gear 40*b*, a first pad gear 51*b*, a second pad gear 52*b*, a first pad 91*b* rotated by the first pad gear 51*b*, and a second pad 92*b* rotated by the second pad gear 52*b*.

The valve device may include a first boss 81*b* arranged under the first pad 91*b* and a second boss 82*b* arranged under the second pad 92*b*.

The pinion gear 40*b* may include a toothed member 401*b*. The toothed member 401*b* may be meshed with the first pad gear 51*b* and the second pad gear 52*b* positioned on opposite sides of the pinion gear 40*b*, so as rotate the first pad gear 51*b* and the second pad gear 52*b*.

The first pad gear 51*b* may include a first engaging member 511*b* meshed with the toothed member 401*b* of the pinion gear 40*b*. The second pad gear 52*b* may include a second engaging member 521*b* meshed with the toothed member 401*b* of the pinion gear 40*b*. The first pad gear 51*b* and the second pad gear 52*b* may be provided to be rotated in opposite directions according to the rotation of the pinion gear 40*b*.

The first pad gear 51*b* may include a first pad valve shaft 512*b*. The first pad valve shaft 512*b* may be provided to pass through the first pad 91*b*.

The second pad gear 52*b* may include a second pad valve shaft 522*b*. The second pad valve shaft 522*b* may be provided to pass through the second pad 92*b*.

The first pad 91*b* may include a first pad valve shaft coupling hole 911*b*. The first pad valve shaft 512*b* of the first pad gear 51*b* may be provided to pass through the first pad valve shaft coupling hole 911*b* of the first pad 91*b*.

The second pad 92*b* may include a second pad valve shaft coupling hole 921*b*. The second pad valve shaft 522*b* of the second pad gear 52*b* may be provided to pass through the second pad valve shaft coupling hole 921*b* of the second pad 92*b*.

The first pad 91*b* may include a first open cavity 913*b* and a connection cavity 914*b*.

The first open cavity 913*b* may be provided to open one of the plurality of refrigerant inlet and outlet holes 811*b*, 812*b*, 813*b*, and 814*b* of the first boss 81*b*, which will be described later. The first open cavity 913*b* may be opened by being cut from the outside to the inside of the first pad 91*b*. Accordingly, the refrigerant introduced into the accommodation space 11 may flow into the first open cavity 913*b*.

The connection cavity 914*b* may be provided in the shape of a groove recessed upward from the lower surface of the pad. The connection cavity 914*b* may be provided to connect two adjacent refrigerant inlet and outlet holes among the plurality of refrigerant inlet and outlet holes 811*b*, 812*b*, 813*b*, and 814*b* of the first boss 81*b* to be described later. Because the connection cavity 914*b* is not opened to the outside of the pad, the refrigerant flowing into the accommodation space 11 may not directly flow into the connection cavity 914*b*.

The first boss 81*b* may include the plurality of refrigerant inlet and outlet holes 811*b*, 812*b*, 813*b*, and 814*b*. The plurality of refrigerant inlet and outlet holes 811*b*, 812*b*, 813*b*, and 814*b* may include a first refrigerant inlet and outlet hole 811*b*, a second refrigerant inlet and outlet hole 812*b*, a third refrigerant inlet and outlet hole 813*b*, and a fourth refrigerant inlet and outlet hole 814*b*. The plurality of refrigerant inlet and outlet holes 811*b*, 812*b*, 813*b*, and 814*b* may be arranged to be spaced apart from each other at intervals of 90 degrees. In addition, the plurality of refrigerant inlet and outlet holes 811*b*, 812*b*, 813*b*, and 814*b* may be arranged at positions spaced apart from the center of the first boss 81*b* by the same distance in the radial direction.

The plurality of refrigerant inlet and outlet holes 811*b*, 812*b*, 813*b*, and 814*b* may be connected to a plurality of inlet and outlet pipes. Particularly, the first refrigerant inlet and outlet hole 811*b* may be connected to a first inlet and outlet pipe 210*b*, the second refrigerant inlet and outlet hole 812*b* may be connected to a second inlet and outlet pipe 220*b*, the third refrigerant inlet and outlet hole 813*b* may be connected to a third inlet and outlet pipe 230*b*, and the fourth refrigerant inlet and outlet hole 814*b* may be connected to a fourth inlet and outlet pipe 240*b*.

The first inlet and outlet pipe 210*b* and the third inlet and outlet pipe 230*b* may be connected with the hot pipe H interposed therebetween. The fourth inlet and outlet pipe 240*b* may be connected to the first capillary tube CA1. The second inlet and outlet pipe 220*b* may be connected to the second capillary tube CA2.

The second pad 92*b* may include a second open cavity 923*b*.

The second open cavity 923*b* may be provided to open a refrigerant flow hole 821*b* of the second boss 82*b* to be described later. The second open cavity 923*b* may be opened by being cut from the outside to the inside of the second pad 92*b*. Accordingly, the refrigerant introduced into the accommodation space 11 may flow into the second open cavity 923*b*.

The second boss 82*b* may include the refrigerant flow hole 821*b*. The refrigerant flow hole 821*b* may be connected to a connection pipe 250*b*. The connection pipe 250*b* may be connected to one of the plurality of inlet and outlet pipes. Details related to this will be described later.

Figure 20:
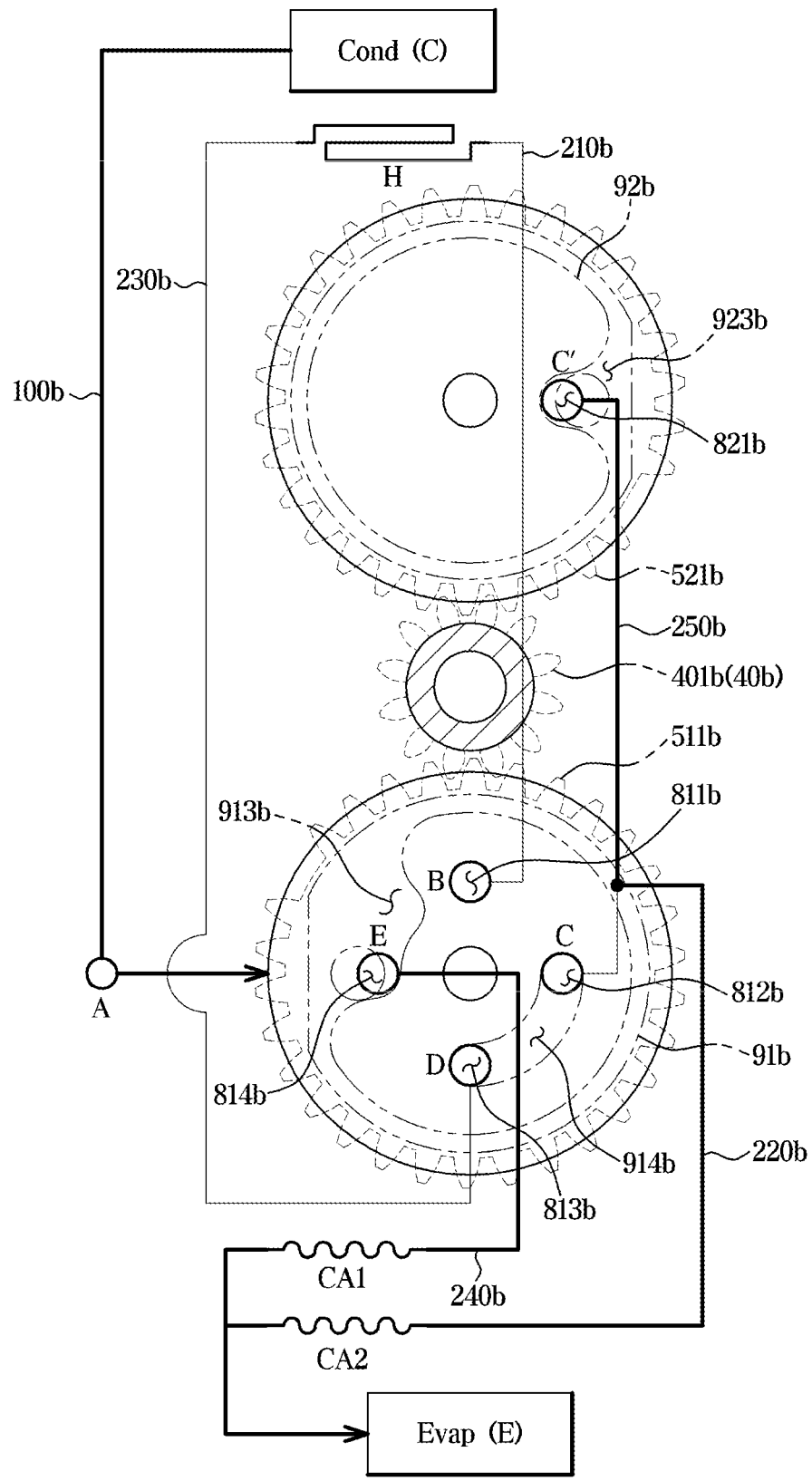
FIG. 20 is a top view illustrating a state in which a hot pipe is bypassed while the simultaneous open mode is performed by a first pad, a first boss, a second pad, and a second boss of the valve device according to FIG. 18.

FIG. 20 is a top view illustrating a state in which the hot pipe is bypassed while the simultaneous open mode is performed by the first pad 91*b*, the first boss 81*b*, the second pad 92*b*, and the second boss 82*b* of the valve device according to FIG. 18

The flow of refrigerant according to the positions of the first pad 91*b* and the first boss 81*b* and the positions of the second pad 92*b* and the second boss 82*b* in the simultaneous open mode will be described with reference to FIG. 20.

In the simultaneous open mode of the valve device according to another embodiment of the disclosure, the first open cavity 913*b* of the first pad 91*b* is positioned to open the fourth refrigerant inlet and outlet hole 814*b* of the first boss 81*b*. At the same time, the connection cavity 914*b* of the first pad 91*b* is positioned to connect the second refrigerant inlet and outlet hole 812*b* to the third refrigerant inlet and outlet hole 813*b* of the first boss 81*b*. The first refrigerant inlet and outlet hole 811*b* is closed by the first pad 91*b*.

Further, the second open cavity 923*b* of the second pad 92*b* is positioned to open the refrigerant flow hole 821*b* of the second boss 82*b*.

The refrigerant introduced into the refrigerant inlet pipe through the compressor flows into the accommodation space 11 of the case 10. The refrigerant flows to the fourth inlet and outlet pipe 240*b* through the opened fourth refrigerant inlet and outlet hole 814*b* of the first boss 81*b*. The fourth inlet and outlet pipe 240*b* is connected to the first capillary tube CA1, and thus the refrigerant is expanded while passing through the first capillary tube CA1.

At the same time, the refrigerant flowing into the accommodation space 11 of the case 10 through the refrigerant inlet pipe flows to the connection pipe 250*b* through the refrigerant flow hole 821*b* of the open second boss 82*b*.

The connection pipe 250*b* may be connected to the second inlet and outlet pipe 220*b* connected to the second capillary tube CA2. That is, the connection pipe 250*b* may be provided to branch from the second inlet and outlet pipe 220*b*.

Accordingly, the refrigerant flowing to the connection pipe 250*b* through the refrigerant flow hole 821*b* of the second boss 82*b* flows to the second inlet and outlet pipe 220*b* and is expanded while passing through the second capillary tube CA2.

Therefore, the valve device illustrated in FIG. 20 may be provided to allow the refrigerant to bypass the hot pipe H in the simultaneous open mode in which the refrigerant passes through both the first capillary tube CA1 and the second capillary tube CA2.

Figure 21:
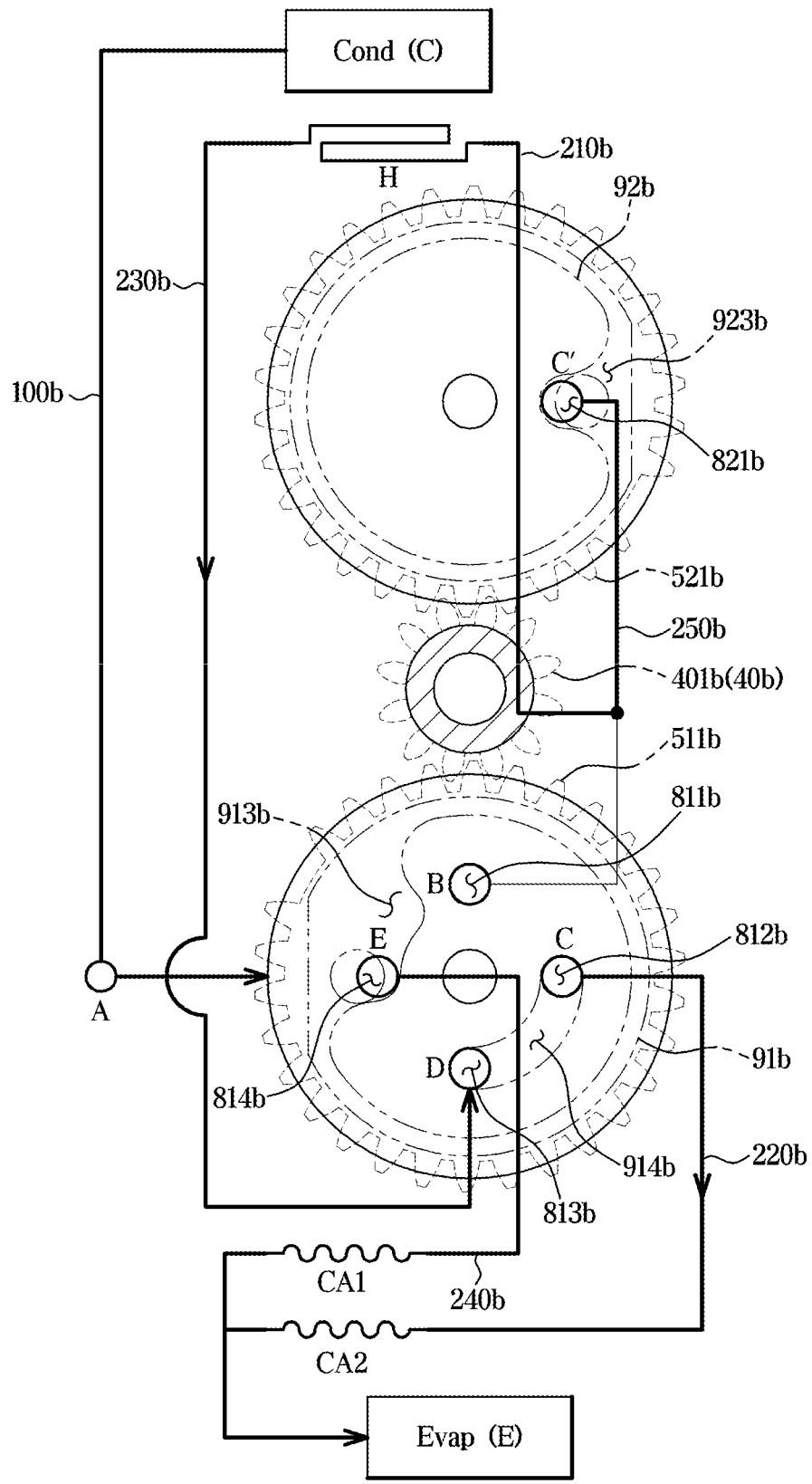
FIG. 21 is a top view illustrating a state in which the hot pipe is passed while the simultaneous open mode is performed by the first pad, the first boss, the second pad, and the second boss of the valve device according to FIG. 18.

FIG. 21 is a top view illustrating a state in which the hot pipe is passed while the simultaneous open mode is performed by the first pad 91*b*, the first boss 81*b*, the second pad 92*b*, and the second boss 82*b* of the valve device according to FIG. 18.

In the simultaneous open mode of the valve device according to another embodiment of the disclosure, the connection pipe 250*b* of FIG. 21 may be provided to be connected to the first inlet and outlet pipe 210*b*, which is unlike FIG. 20.

The first open cavity 913*b* of the first pad 91*b* is positioned to open the fourth refrigerant inlet and outlet hole 814*b* of the first boss 81*b*. At the same time, the connection cavity 914*b* of the first pad 91*b* is positioned to connect the second refrigerant inlet and outlet hole 812*b* to the third refrigerant inlet and outlet hole 813*b* of the first boss 81*b*. The first refrigerant inlet and outlet hole 811*b* is closed by the first pad 91*b*.

Further, the second open cavity 923*b* of the second pad 92*b* is positioned to open the refrigerant flow hole 821*b* of the second boss 82*b*.

The refrigerant introduced into the refrigerant inlet pipe through the compressor flows into the accommodation space 11 of the case 10. The refrigerant flows to the fourth inlet and outlet pipe 240*b* through the opened fourth refrigerant inlet and outlet hole 814*b* of the first boss 81*b*. The fourth inlet and outlet pipe 240*b* is connected to the first capillary tube, and the refrigerant is expanded while passing through the first capillary tube CA1.

At the same time, the refrigerant flowing into the accommodation space 11 of the case 10 through the refrigerant inlet pipe flows to the connection pipe 250*b* through the opened refrigerant flow hole 821*b* of the second boss 82*b*.

The connection pipe 250*b* may be connected to the first inlet and outlet pipe 210*b* connected to the hot pipe H. That is, the connection pipe 250*b* may be provided to branch from the first inlet and outlet pipe 210*b*.

Accordingly, the refrigerant flowing to the connection pipe 250*b* through the refrigerant flow hole 821*b* of the second boss 82*b* may flow to the first inlet and outlet pipe 210*b*, and flow to the third inlet and outlet pipe 230*b* through the hot pipe H.

The refrigerant flowing to the third inlet and outlet pipe 230*b* may be introduced into the second refrigerant inlet and outlet hole 812b connected to the connection cavity 914b through the third refrigerant inlet and outlet hole 813b. The refrigerant introduced into the second refrigerant inlet and outlet hole 812b may pass through the second capillary tube CA2 through the second inlet and outlet pipe 220b. The refrigerant may be expanded while passing through the second capillary tube CA2.

Therefore, the valve device illustrated in FIG. 21 may be provided to allow the refrigerant to pass the hot pipe H in the simultaneous open mode in which the refrigerant passes through both the first capillary tube CA1 and the second capillary tube CA2.

Accordingly, in the state in which a single valve device performs the simultaneous open mode, the refrigerant may pass or bypass the hot pipe H according to the designer's selection.

As is apparent from the above description, a single valve device may implement the simultaneous open mode in which the refrigerant flows through the first capillary tube and the second capillary tube while allowing the refrigerant to selectively flow through the hot pipe.

In addition, it is possible to perform various refrigerant flow modes while simplifying the configuration of the pipe, and thus it is effective to reduce costs and increase space utilization.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A valve device comprising:
   a case having a lower portion and an accommodation space;
   a base plate to cover the lower portion of the case;
   a refrigerant inlet pipe to be connected to the base plate so that while the refrigerant inlet pipe is connected to the base plate the refrigerant inlet pipe allows a refrigerant to flow into the accommodation space;
   an inlet and outlet pipe to be connected to the base plate so that while the inlet and outlet pipe is connected to the base plate the inlet and outlet pipe allows the refrigerant to flow in and out;
   a boss comprising a refrigerant inlet and outlet hole formed at a first position spaced apart from a center of the boss to allow the refrigerant to flow in and out through the inlet and outlet pipe, and an extending groove extending radially from the refrigerant inlet and outlet hole at the first position to a second position and connecting the refrigerant inlet and outlet hole with a portion of the extending groove at the second position; and
   a pad rotatable on one side of the boss to close the refrigerant inlet and outlet hole and to open the extending groove,
   wherein the pad comprises:
      a first open cavity cut from an outside of the pad to the second position,
      a sealing body in contact with an upper surface of the boss to close the refrigerant inlet and outlet hole and the extending groove of the boss, and
      a second open cavity cut from the outside of the pad to the first position to open the refrigerant inlet and outlet hole at one side of the sealing body,
   wherein the extending groove comprises:
      an opening member in communication with the accommodation space by the first open cavity of the pad to receive the refrigerant and extending along a direction in which the pad is rotatable; and
      a connection member connected to the opening member to allow the refrigerant to flow into the refrigerant inlet and outlet hole,
   wherein the sealing body is disposed to close the refrigerant inlet and outlet hole and cover the connection member, in a state where the first open cavity is positioned to open the opening member.

2. The valve device of claim 1, wherein
   the first position is spaced apart from the center of the boss by a first distance in a radial direction, and the second position is spaced apart from the center of the boss by a second distance in the radial direction,
   wherein the second distance is greater than the first distance.

3. The valve device of claim 1, wherein
   the sealing body comprises a connection cavity cut along the direction in which the pad is rotatable and which is at the first position.

4. The valve device of claim 3, wherein
   the refrigerant inlet and outlet hole is a first refrigerant inlet and outlet hole,
   wherein the boss further comprises a second refrigerant inlet and outlet hole, a third refrigerant inlet and outlet hole, and a fourth refrigerant inlet and outlet hole, which are spaced apart from each other at intervals of 90 degrees clockwise from the first refrigerant inlet and outlet hole with respect to the center of the boss.

5. The valve device of claim 4, wherein
   the inlet and outlet pipe is a first inlet and outlet pipe connected to the first refrigerant inlet and outlet hole,
   the valve device further comprises:
      a second inlet and outlet pipe connected to the second refrigerant inlet and outlet hole;
      a third inlet and outlet pipe connected to the third refrigerant inlet and outlet hole; and
      a fourth inlet and outlet pipe connected to the fourth refrigerant inlet and outlet hole.

6. The valve device of claim 5, wherein
   the refrigerant inlet pipe is connected to a condenser to receive the refrigerant from the condenser therethrough, the first inlet and outlet pipe and the third inlet and outlet pipe are connected to a hot pipe, the fourth inlet and outlet pipe is connected to a first capillary tube, and the second inlet and outlet pipe is connected to a second capillary tube.

7. The valve device of claim 6, wherein
   based on operating in a simultaneous open mode of the valve device, the pad is rotated to allow the first open cavity to open the extending groove and to allow the second open cavity to open the fourth refrigerant inlet and outlet hole so that the refrigerant introduced into the accommodation space through the refrigerant inlet pipe is introduced into the fourth refrigerant inlet and outlet hole and then flow to the first capillary tube, and at a same time, the refrigerant introduced into the first refrigerant inlet and outlet hole through the extending groove is introduced into the third refrigerant inlet and outlet hole through the hot pipe, and then introduced into the second refrigerant inlet and outlet hole through the connection cavity and flows into the second capillary tube.

8. The valve device of claim 7, wherein
the first open cavity and the second open cavity are connected to each other.

\* \* \* \* \*